US012586791B2

(12) United States Patent
Sun et al.

(10) Patent No.: US 12,586,791 B2
(45) Date of Patent: Mar. 24, 2026

(54) FLUORINE-CONTAINING POSITIVE ELECTRODE ACTIVE MATERIAL FOR LITHIUM SECONDARY BATTERY, AND LITHIUM SECONDARY BATTERY INCLUDING SAME

(71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Un-Hyuck Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 888 days.

(21) Appl. No.: 17/789,311

(22) PCT Filed: Dec. 24, 2020

(86) PCT No.: PCT/KR2020/019140
§ 371 (c)(1),
(2) Date: Jun. 27, 2022

(87) PCT Pub. No.: WO2021/133119
PCT Pub. Date: Jul. 1, 2021

(65) Prior Publication Data
US 2023/0047820 A1 Feb. 16, 2023

(30) Foreign Application Priority Data

Dec. 26, 2019 (KR) ......................... 10-2019-0174634
Dec. 24, 2020 (KR) ......................... 10-2020-0183570

(51) Int. Cl.
$H01M\ 4/58$ (2010.01)
$H01M\ 4/02$ (2006.01)
(Continued)

(52) U.S. Cl.
CPC ........... H01M 4/582 (2013.01); H01M 4/364 (2013.01); H01M 4/366 (2013.01); H01M 10/0525 (2013.01); H01M 2004/028 (2013.01)

(58) Field of Classification Search
None
See application file for complete search history.

(56) References Cited

U.S. PATENT DOCUMENTS 5,773,168 A * 6/1998 Kubo ..................... H01M 4/525
29/623.5
2015/0064563 A1* 3/2015 Kim ....................... H01M 4/505
429/223
(Continued)

FOREIGN PATENT DOCUMENTS

CN 108483516 A 9/2018
JP 2016-76369 A 5/2016
(Continued)

OTHER PUBLICATIONS

S. Krishna Kumar et al., "Synergistic effect of 3D electrode architecture and fluorine doping of $Li_{1.2}Ni_{0.15}Mn_{0.55}Co_{0.1}O_2$ for high energy density lithium-ion batteries", Journal of Power Sources, 2017, pp. 115-123, vol. 356.
(Continued)

*Primary Examiner* — Maria Laios
(74) *Attorney, Agent, or Firm* — Sughrue Mion, PLLC

(57) ABSTRACT
The present invention pertains to a positive electrode active material for a lithium secondary battery, the positive electrode active material having a layered structure and containing lithium, transition metals, fluorine (F), and oxygen,
(Continued)

wherein the layered structure includes a lithium layer consisting solely of lithium and a transition metal layer consisting solely of transition metals including nickel, the nickel includes $Ni^{3+}$ and $Ni^{2+}$ in terms of oxidation number, and the ratio ($Ni^{2+}/Ni^{3+}$) of $Ni^{2+}$ to $Ni^{3+}$ increases as the fluorine content increases.

15 Claims, 12 Drawing Sheets

(51) Int. Cl.
  *H01M 4/36*    (2006.01)
  *H01M 10/0525*  (2010.01)

(56)      References Cited

U.S. PATENT DOCUMENTS

| | | | |
|---|---|---|---|
| 2017/0069911 | A1 | 3/2017 | Volkov et al. |
| 2017/0125801 | A1 | 5/2017 | Kim et al. |
| 2019/0067694 | A1 * | 2/2019 | Sun ...................... H01M 4/366 |

FOREIGN PATENT DOCUMENTS

| | | |
|---|---|---|
| KR | 10-2011-0076955 A | 7/2011 |
| KR | 10-2014-0119621 A | 10/2014 |
| KR | 10-1667968 B1 | 10/2016 |
| KR | 10-2017-0124105 A | 11/2017 |
| KR | 10-2018-0077081 A | 7/2018 |
| KR | 10-1918723 B1 | 11/2018 |
| WO | WO-2017188802 A1 * | 11/2017 ............. C01G 53/04 |

OTHER PUBLICATIONS

International Search Report of PCT/KR2020/019140 dated Apr. 6, 2021 [PCT/ISA/210].

Extended European Search Report dated Dec. 22, 2023 in European Application No. 20908362.5.

Li et al., "Effects of fluorine substitution on the electrochemical performance of layered Li-excess nickel manganese oxides cathode materials for lithium-ion batteries", Electrochimica Acta, 2013, vol. 113, pp. 407-411 (5 pages total).

Meng et al., "Cation Ordering in Layered O3 $Li[NI_xLi_{1/3-2x/3}Mn_{2/3-x/3}]O2$ ($0 \leq x \leq 1/2$) Compounds", Chem. Mater., 2005, vol. 17, pp. 2386-2394 (9 pages total).

Chinese Office Action dated Aug. 31, 2023 in Chinese Application No. 202080089922.8.

Li et al., "Inducing Favorable Cation Antisite by Doping Halogen in Ni-Rich Layered Cathode with Ultrahigh Stability", Adv. Sci., 2019, vol. 6, pp. 1-8 (8 pages total).

S.-U. Woo et al., "Improvement of Electrochemical Performances of Li[Ni0.8Co0.1Mn0.1]O2 Cathode Materials by Fluorine Substitution", Journal of the Electrochemical Society, 2007, vol. 154, No. 7, pp. A649-A655 (8 pages).

Dongming Liu et al., "A cation/anion co-doped Li1.12Na0.08Ni0.2Mn0.6O1.95F0.05 cathode for lithium ion batteries", Nano Energy, 2019, vol. 58, pp. 786-796 (11 pages).

* cited by examiner

[FIG. 1]
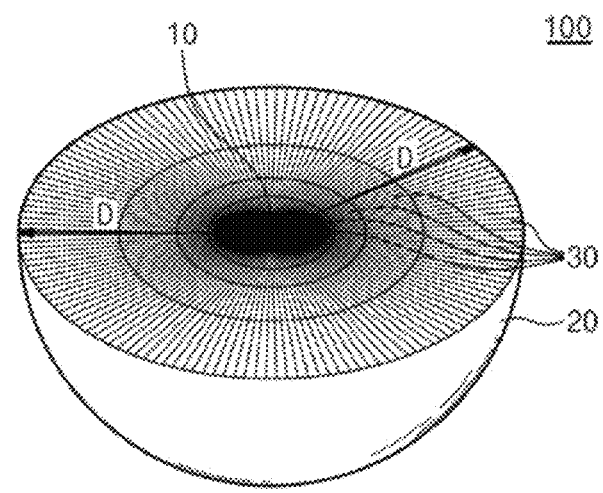
[FIG. 2]
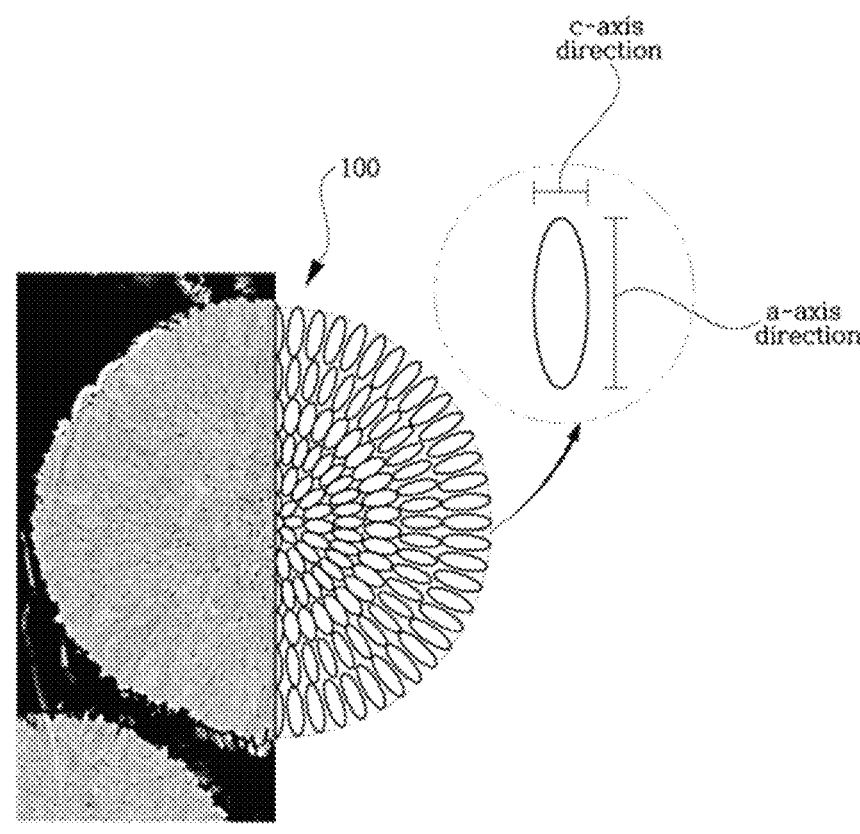

[FIG. 3]

[FIG. 4]
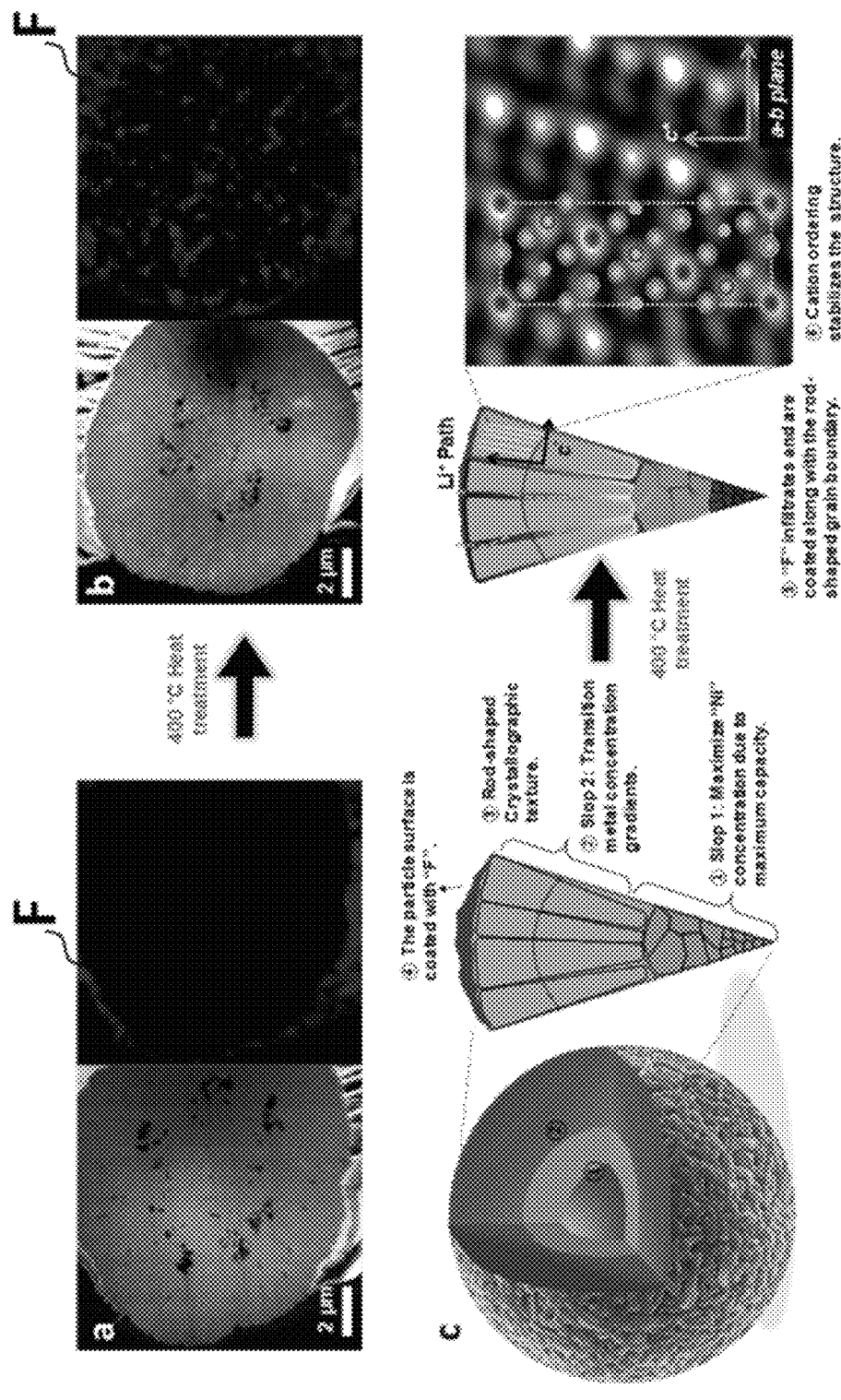

[FIG. 5]
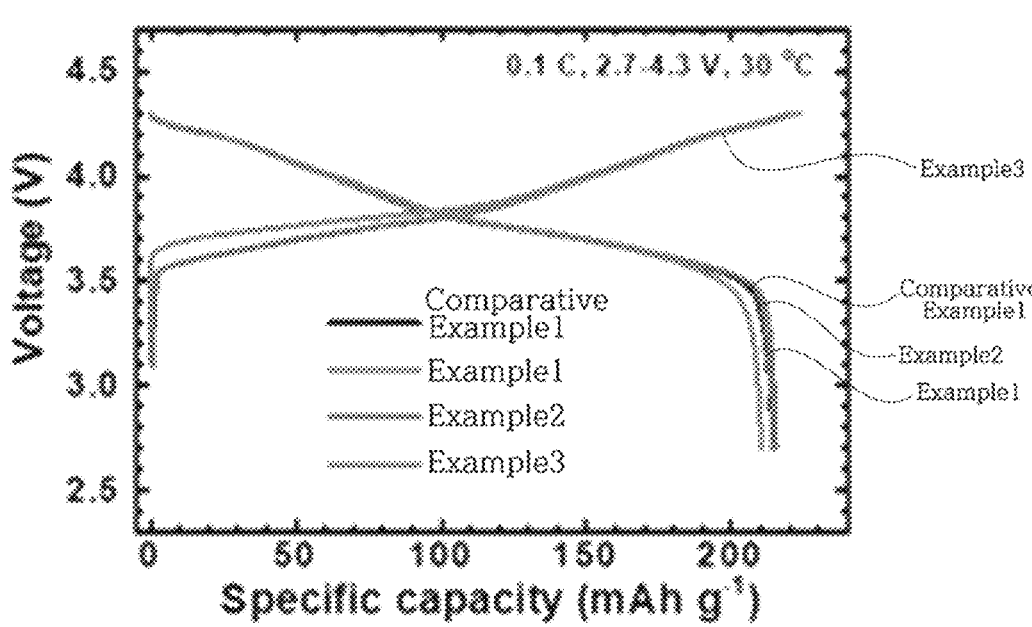
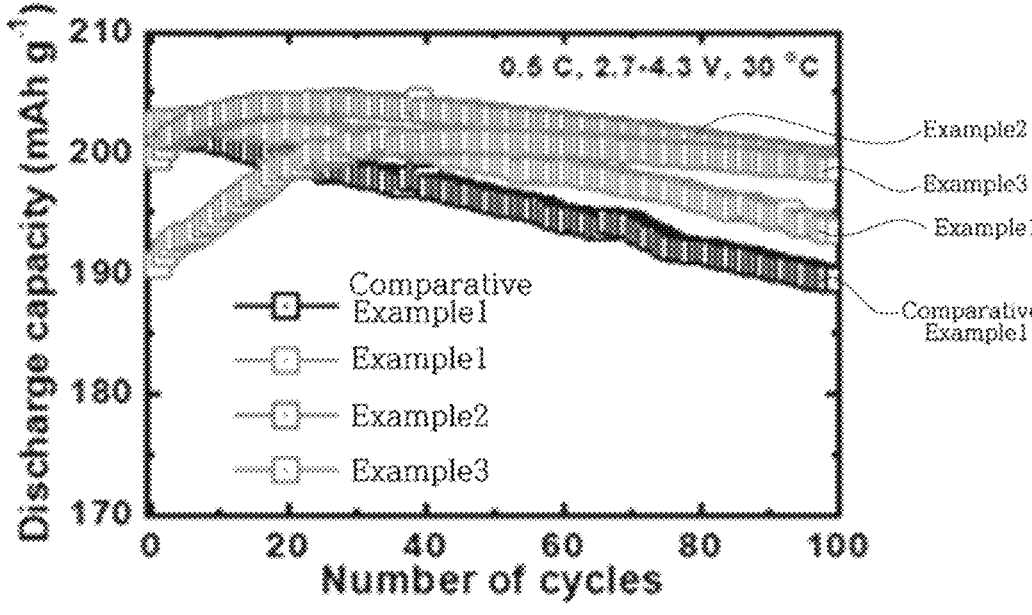

[FIG. 6]
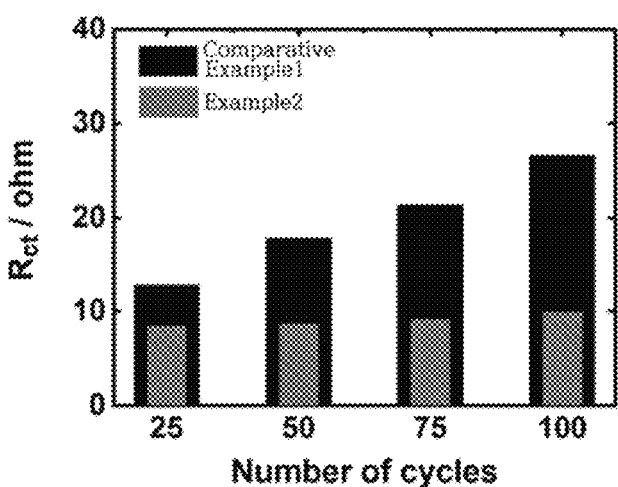
[FIG. 7]
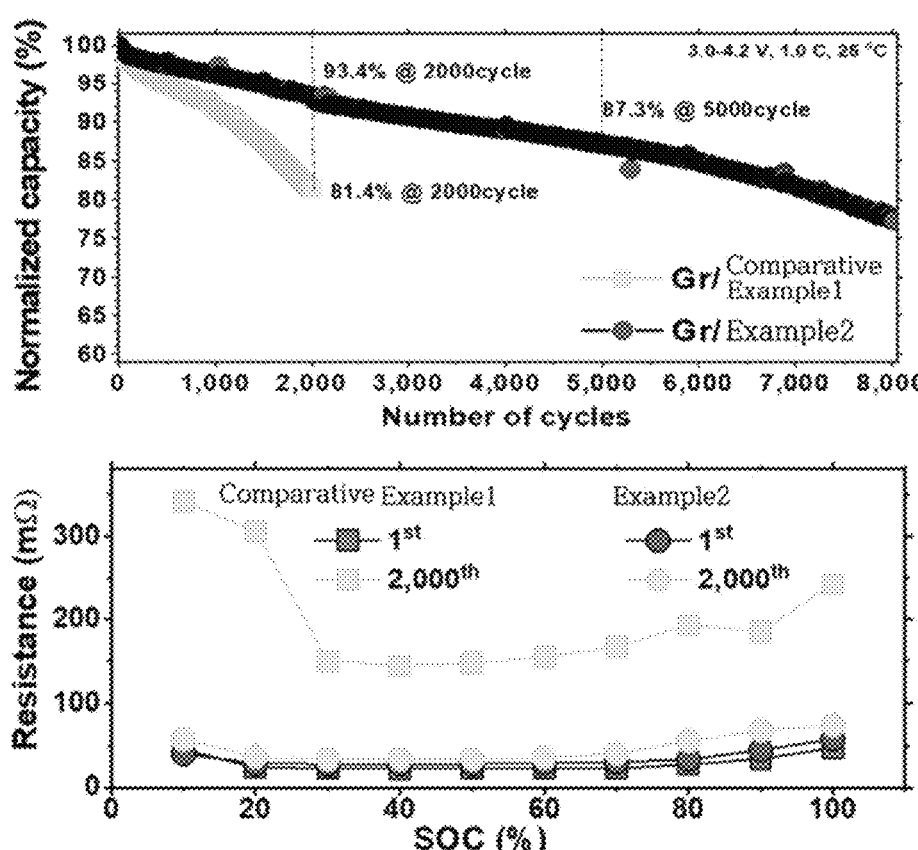

[FIG. 8]
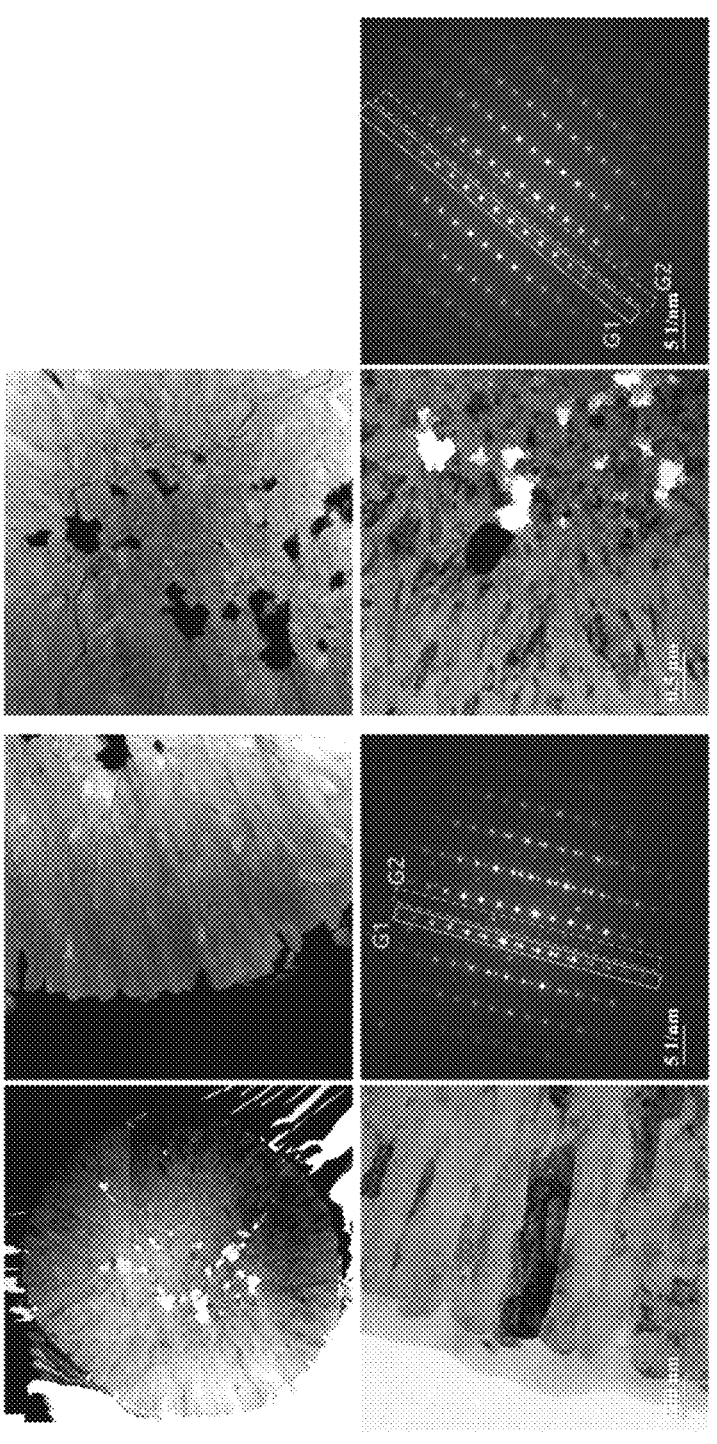

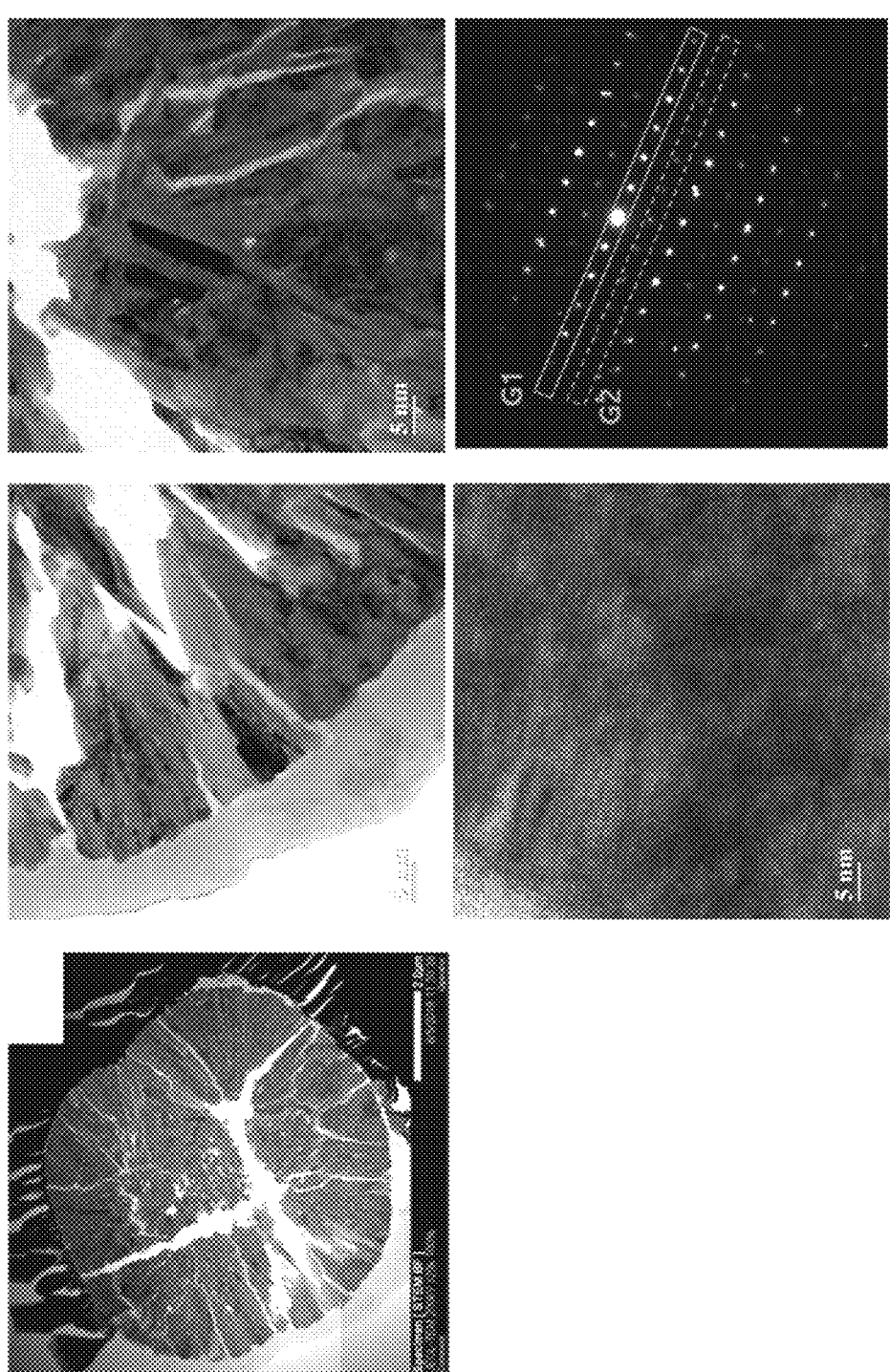
[FIG. 9]

[FIG. 10]
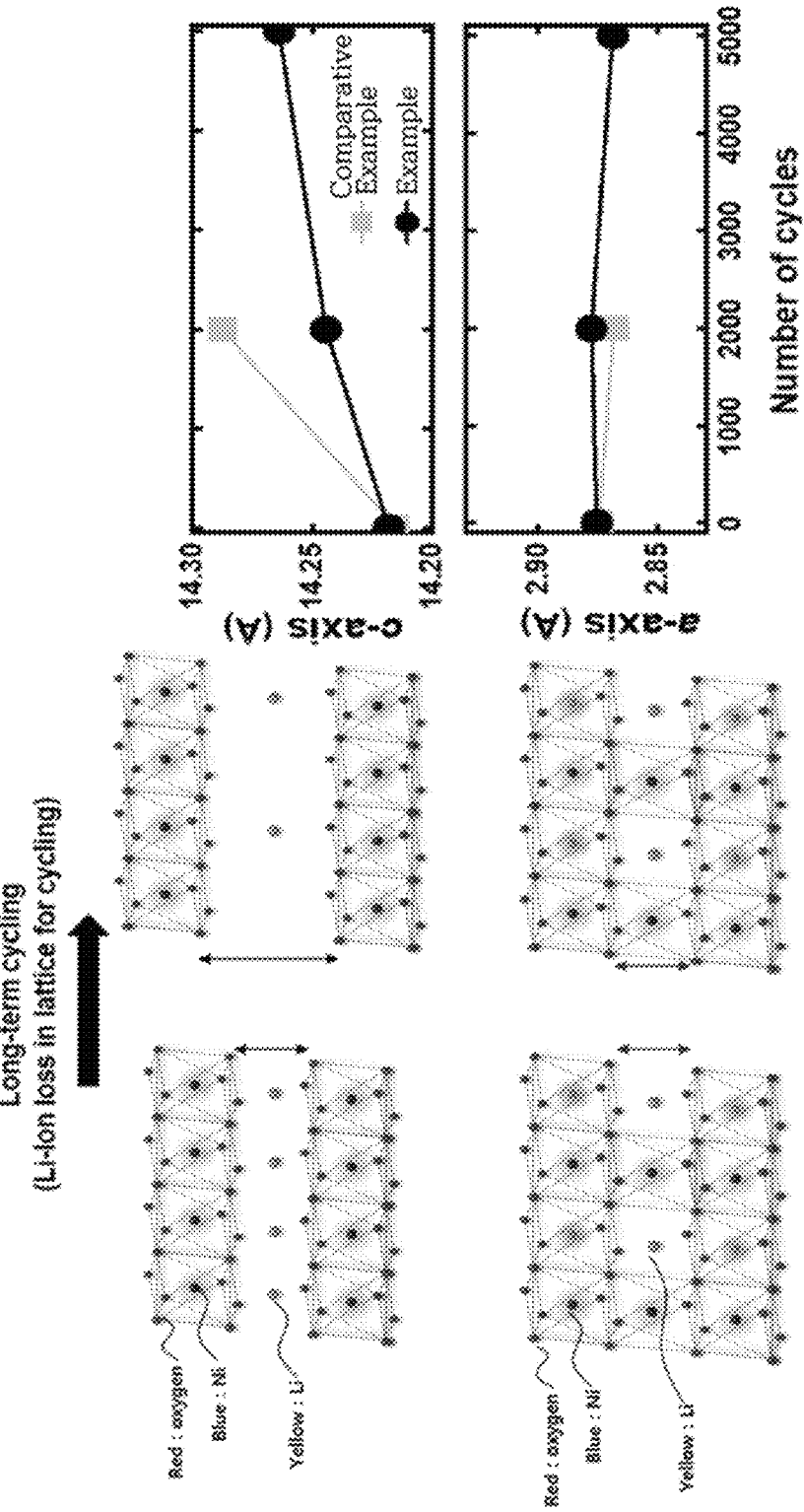

[FIG. 11]
(a)
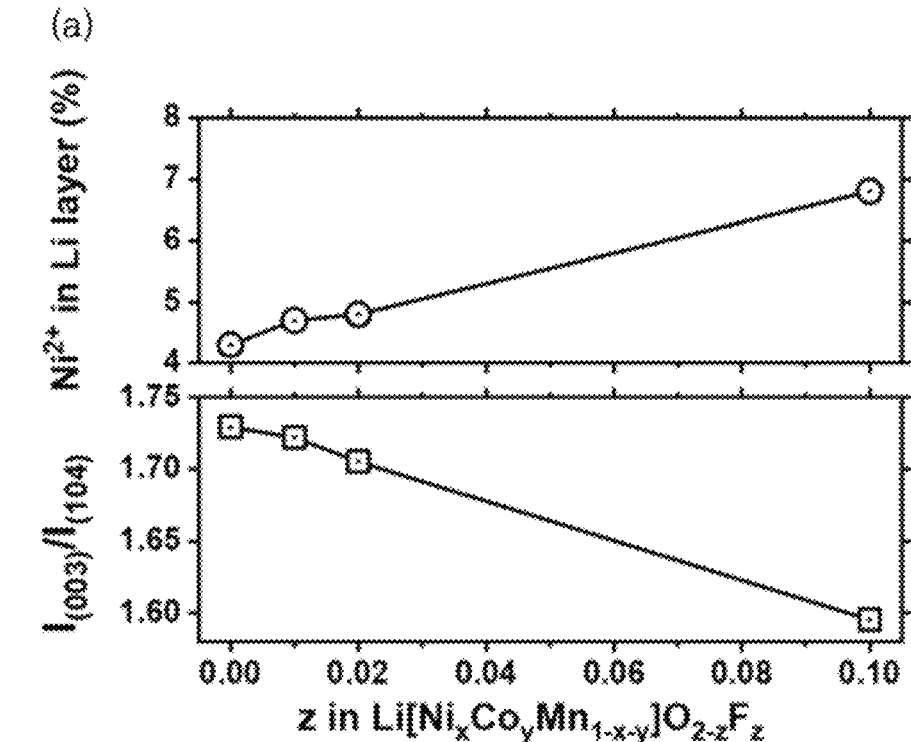
(b)
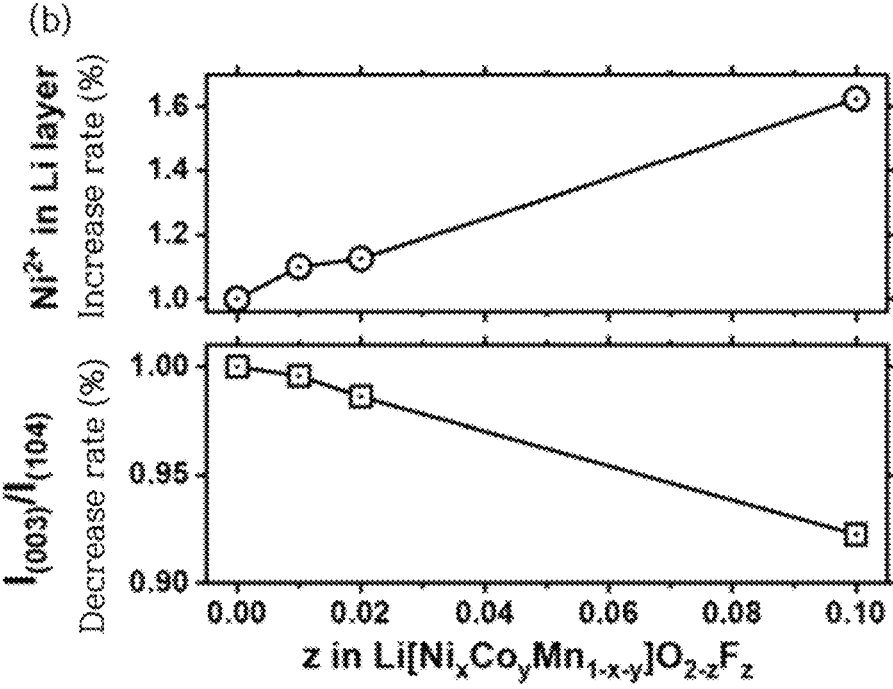

[FIG. 12]
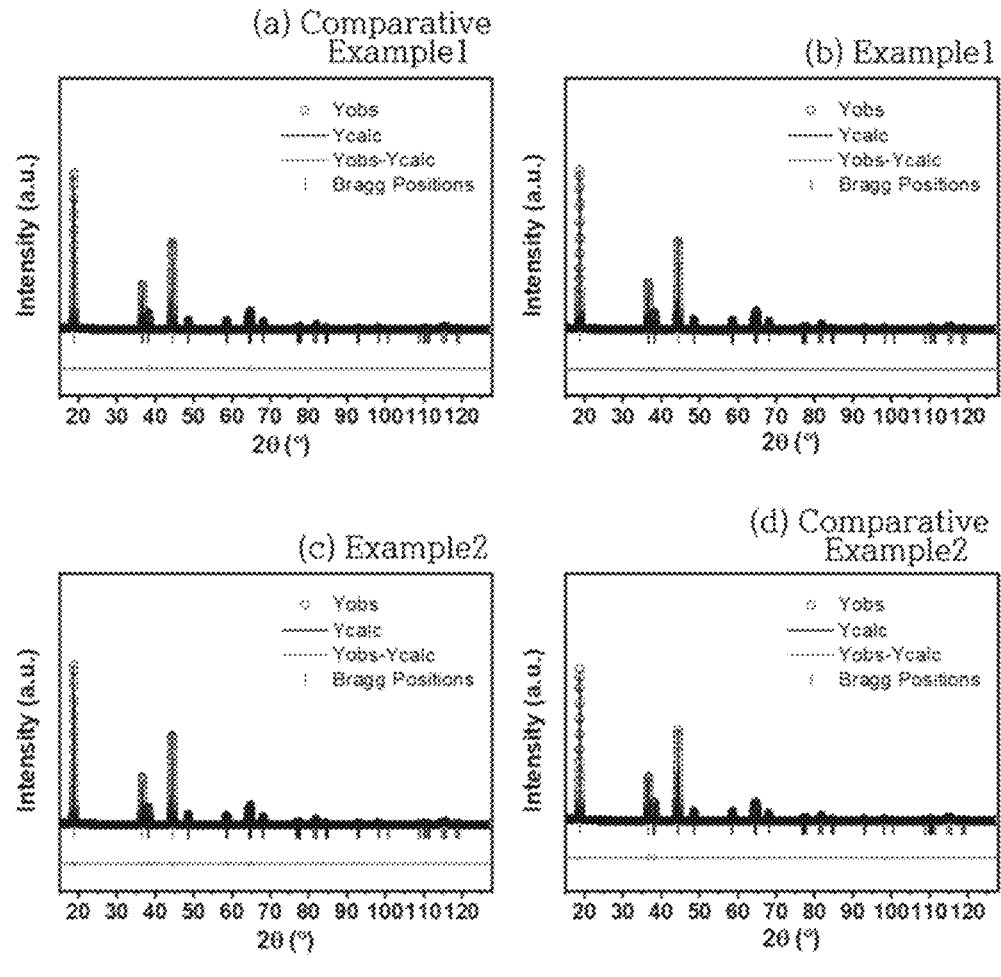

[FIG. 13]
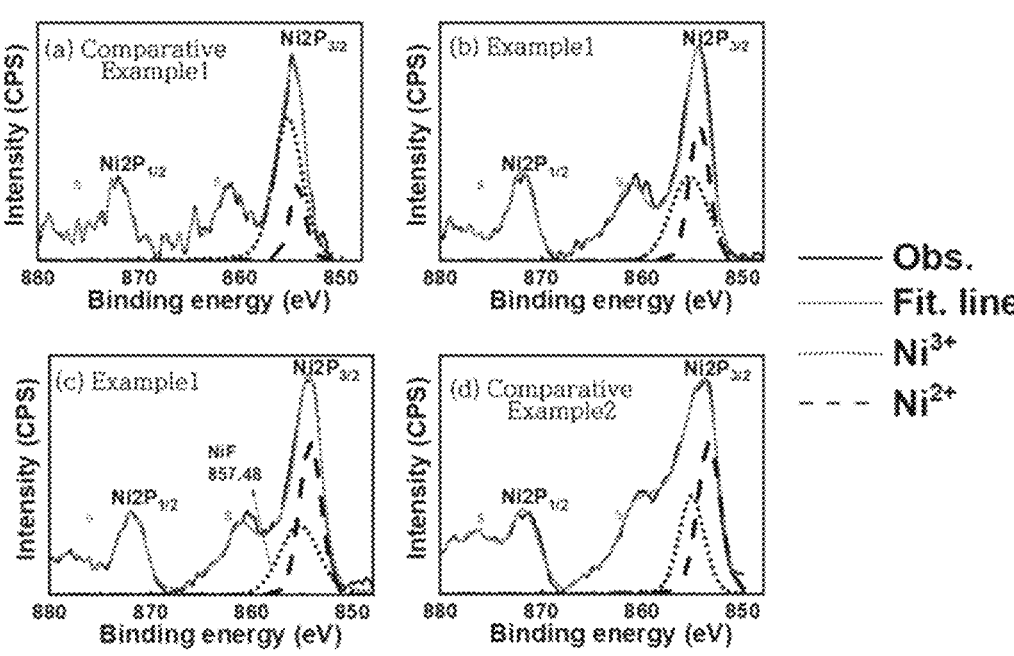

[FIG. 14]
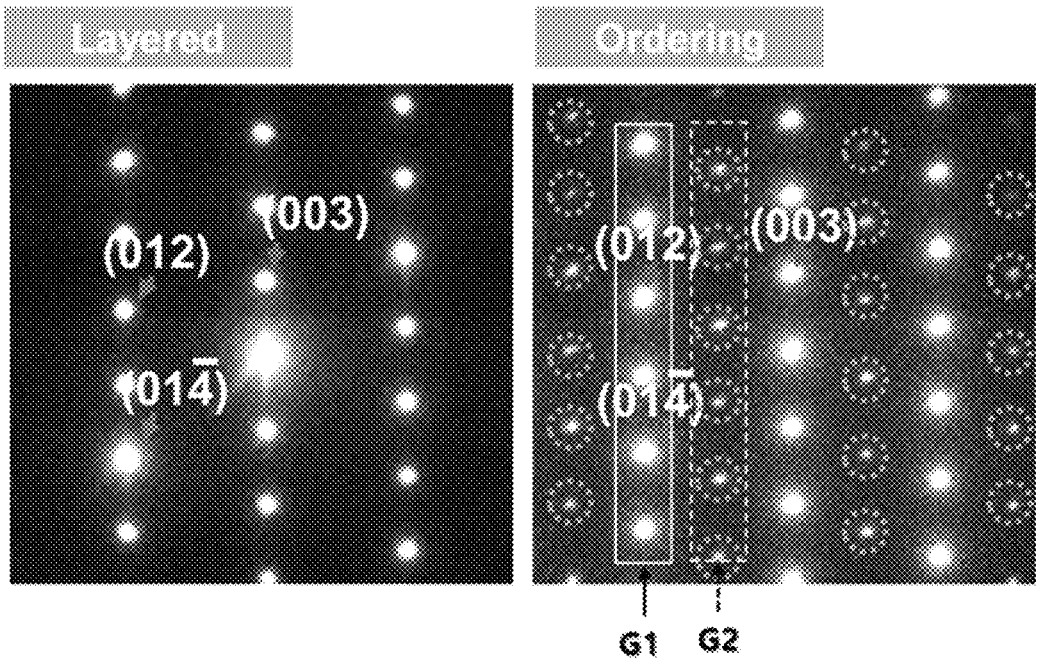
[FIG. 15]
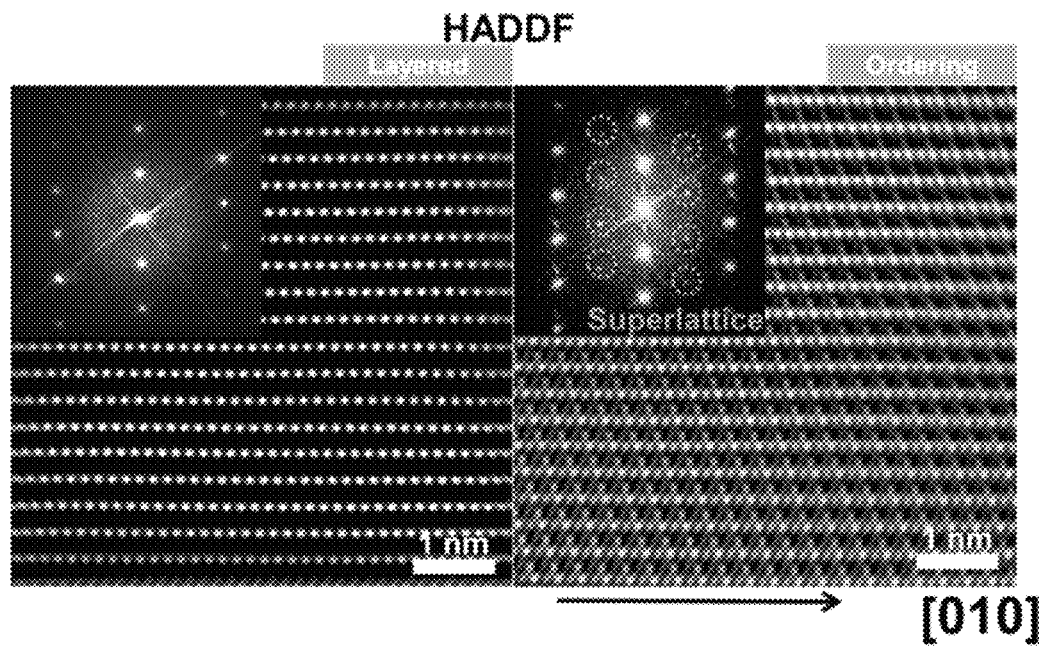

FLUORINE-CONTAINING POSITIVE ELECTRODE ACTIVE MATERIAL FOR LITHIUM SECONDARY BATTERY, AND LITHIUM SECONDARY BATTERY INCLUDING SAME

CROSS REFERENCE TO RELATED APPLICATIONS

This application is a National Stage of International Application No. PCT/KR2020/019140 filed on Dec. 24, 2020, claiming priority based on Korean Patent Application No. 10-2019-0174634 filed on Dec. 26, 2019 and Korean Patent Application No. 10-2020-0183570 filed on Dec. 24, 2020.

TECHNICAL FIELD

The present invention relates to a positive electrode active material and a lithium secondary battery including the same, and more particularly, to a positive electrode active material for a lithium secondary battery having improved cycle life and capacity characteristics by containing fluorine, and a lithium secondary battery including the same.

BACKGROUND ART

With the development of portable mobile electronic devices such as smart phones, MP3 players, and tablet PCs, the demand for secondary batteries capable of storing electrical energy has increased explosively. In particular, with the advent of electric vehicles, medium and large energy storage systems, and portable devices requiring high energy density, the demand for lithium secondary batteries has increased.

With an increasing demand for such lithium secondary batteries, research and development for positive electrode active materials for use in lithium secondary batteries has been conducted. For example, Korean Patent Application Publication No. 10-2014-0119621 (Korean Patent Application No. 10-2013-0150315) discloses a secondary battery having high-voltage capacity and long cycle life characteristics as a result of controlling the kinds and composition of metals substituted in a precursor for preparing a lithium-rich positive electrode active material and controlling the kinds and amounts of metals added.

DISCLOSURE

Technical Problem

An object of the present invention is to provide a fluorine-containing positive electrode active material for a lithium secondary battery having high capacity and improved cycle characteristics while containing a large amount of nickel, and a lithium secondary battery including the same.

Another object of the present invention is to provide a fluorine-containing positive electrode active material for a lithium secondary battery having a layered structure that has enhanced structural stability as a result of controlling the oxidation number of nickel by the addition of fluorine and shows a low capacity decrease even after long-term cycling, and a lithium secondary battery including the same.

Objects to be achieved by the present invention are not limited to the above-described objects.

Technical Solution

To achieve the above objects, the present invention provides a fluorine-containing positive electrode active material for a lithium secondary battery and a lithium secondary battery including the same.

According to one embodiment, the positive electrode active material for a lithium secondary battery has a layered structure and contains lithium, a transition metal, fluorine (F) and oxygen, wherein the layered structure includes a lithium layer consisting of only lithium, and a transition metal layer consisting of only a transition metal including nickel, wherein the nickel includes $Ni^{3+}$ and $Ni^{2+}$ in terms of oxidation number, and the ratio of the $Ni^{2+}$ to the $Ni^{3+}$ ($Ni^{2+}/Ni^{3+}$) increases with increasing content of the fluorine.

In one embodiment, the layered structure may further include a first mixed layer and a second mixed layer, each containing lithium and a transition metal, wherein the content of lithium in the first mixed layer may be higher than the content of the transition metal, and the content of the transition metal in the second mixed layer may be higher than the content of lithium.

In one embodiment, the first mixed layer and the second mixed layer in the positive electrode active material may be stacked adjacent to each other and alternately and regularly repeated to form a layered structure, and the first and second mixed layers stacked adjacent to each other may be configured such that the transition metal of the first mixed layer and the lithium of the second mixed layer may correspond to each other.

In one embodiment, the first and second mixed layers stacked adjacent to each other may have an ordered structure, wherein the ordered structure may be formed such that n1 lithium ions and n2 transition metal ions of the first mixed layer may respectively correspond to n1 transition metal ions and n2 lithium ions of the second mixed layer (where n1 and n2 are the same or different natural numbers), and a unit cell formed by the ordered structure may include a long-range ordered lattice with an increased a-axis lattice constant.

In one embodiment, a lattice formed by the first and second mixed layers stacked adjacent to each other may include a superlattice whose a-axis is twice as long as that of a lattice formed by the lithium layer and the transition metal layer.

In one embodiment, a decrease in the ratio ($I_{(003)}/I_{(104)}$) of the peak ($I_{(003)}$) of the (003) plane to the peak ($I_{(004)}$) of the (004) plane in the X-ray diffraction spectrum of the positive electrode active material, obtained by XRD analysis using CuKα radiation after an electrochemical reaction, may be less than 1%.

In one embodiment, the ratio ($I_{(003)}/I_{(104)}$) of the peak ($I_{(003)}$) of the (003) plane to the peak ($I_{(004)}$) of the (004) plane may be 1.71 or less.

In one embodiment, in the XPS spectrum of Ni2P obtained by X-ray photoelectron spectroscopy (XPS), the peak area of $Ni^{2+}$ at a binding energy of 850 to 860 eV may be greater than the peak area of $Ni^{3+}$, and the ratio of $Ni^{2+}$ to $Ni^{3+}$ ($Ni^{2+}/Ni^{3+}$) may be 49% to 130%.

In one embodiment, the ratio of the peak area of $Ni^{2+}$ to the peak area of $Ni^{3+}$ at a binding energy of 850 to 860 eV may be 0.49:1 to 1.3:1.

In one embodiment, the positive electrode active material may include a secondary particle consisting of a group of a plurality of primary particles, and at least one of the primary particles may include a fluorine-containing grain coating layer at a grain boundary between the primary particles.

3

In one embodiment, the positive electrode active material may be represented by the following Formula 1:

$$Li_{1-x}M_{1-y}[Li_xM_y]O_{2-z}F_z \quad \text{[Formula 1]}$$

wherein x+y=1; $0.005 \leq z \leq 0.02$; and M is any one of Ni; Ni and Co; Ni and Mn; Ni, Co and Mn; Ni and Al; Ni, Co and Al; Ni, Mn and Al; and Ni, Co, Mn and Al.

In one embodiment, the ratio of $Ni^{2+}$ to $Ni^{3+}$ ($Ni^{2+}/Ni^{3+}$) may decreases as the content of nickel in Formula 1 increases.

In one embodiment, the layered structure may further include a first mixed layer and a second mixed layer, each containing lithium and a transition metal; the content of lithium in the first mixed layer is higher than the content of the transition metal, and the content of the transition metal in the second mixed layer is higher than the content of lithium; the first mixed layer and the second mixed layer in the positive electrode active material are stacked adjacent to each other and are alternately and regularly repeated to form a layered structure; and an electron diffraction pattern for the [010] zone axis or [100] zone axis of the layered structure may show: a first diffraction spot group in which one or more diffraction spots having a first intensity and corresponding to a lattice formed by the lithium layer and transition metal layer stacked adjacent to each other are aligned in one direction; and a second diffraction spot group in which one or more diffraction spots having a second intensity lower than the first intensity of the diffraction spots of the first diffraction group and corresponding to a lattice formed by the first mixed layer and second mixed layer stacked adjacent to each other are aligned in one direction.

In an embodiment, the first diffraction spot and the second diffraction spot group may be arranged alternately with each other and regularly, and the first diffraction spot and the second diffraction spot group may be spaced apart from each other.

In one embodiment, the layered structure may further include a first mixed layer and a second mixed layer, each containing lithium and a transition metal, wherein the content of lithium in the first mixed layer may be higher than the content of the transition metal, the content of the transition metal in the second mixed layer may be higher than the content of lithium, the lithium and transition metal in the first mixed layer may be alternately arranged, the transition metal and lithium in the second mixed layer may be alternately arranged, and a lattice formed by the first and second mixed layers stacked adjacent to each other may include a superlattice.

In one embodiment, the transition metal includes any one or more of nickel (Ni), manganese (Mn) and cobalt (Co), wherein the nickel has an oxidation number of 2+ and 3+, and the manganese has an oxidation number of 3+ or 4+, and the cobalt may have an oxidation number of 3+.

In one embodiment, the primary particles may include rod-shaped particles formed in a flake shape whose cross-section has a long axis and a short axis, and the rod-shape particles may be oriented so that the long axis thereof faces the central portion of the secondary particle.

In one embodiment, the transition metal may include any one or more of nickel (Ni), manganese (Mn) and cobalt (Co), wherein at least one of the transition metals may have a concentration gradient from the center of the secondary particle toward the surface thereof in at least a portion of the secondary particle.

In one embodiment, the nickel (Ni) may be contained in an amount of 70 mol % or more.

According to another aspect of the present invention, one embodiment of the present invention includes a lithium secondary battery including: a positive electrode including the above-described positive electrode active material for a lithium secondary battery; a negative electrode facing the positive electrode and composed of graphite or lithium metal; a separator interposed between the positive electrode and the negative electrode; and an electrolyte solution or solid electrolyte containing a lithium salt.

Advantageous Effects

According to the present invention as described above, it is possible to provide a fluorine-containing positive electrode active material for a lithium secondary battery, which has a high content of nickel and has improved cycle life characteristics due to suppressed side reactions between an electrolyte and the positive electrode active material while maintaining high discharge capacity, and a lithium secondary battery including the same.

In addition, according to the present invention, it is possible to provide a fluorine-containing positive electrode active material for a lithium secondary battery, which has a layered structure and a novel crystal structure which is maintained during long-term cycling while having a high content of nickel (Ni-rich), and thus has improved stability and reliability, and a lithium secondary battery including the same.

BRIEF DESCRIPTION OF DRAWINGS

FIG. 1 schematically shows a secondary particle according to an embodiment of the present invention.

FIG. 2 is a schematic sectional view of a positive electrode active material according to an embodiment of the present invention.

FIG. 3 schematically shows the movement of lithium ions in the positive electrode active material according to an embodiment of the present invention.

FIG. 4 schematically shows images (FIGS. 4a and 4b) of a positive electrode active material according to Example 1 of the present invention before and after fluorine addition and heat treatment, and an ordered structure (c) of the positive electrode active material, formed by fluorine addition.

FIG. 5 depicts graphs showing the electrochemical capacities (FIG. 5a) and cycle life characteristics (FIG. b) of coin cells employing the positive electrode active materials according to Examples 1 to 3 of the present invention and Comparative Example 1.

FIG. 6 is a graph showing the resistance of coin cells employing the positive electrode active materials according to Comparative Examples 1 and Example 2 of the present invention.

FIG. 7 depicts graphs showing the cycle characteristics and resistances versus SOC of full cells employing the positive electrode active materials according to Comparative Examples 1 and Example 2 of the present invention.

FIG. 8 shows TEM images showing an ordered structure of the positive electrode active material according to Example 2 after 2,000 cycles.

FIG. 9 shows TEM images showing an ordered structure of the positive electrode active material according to Example 2 after 5,000 cycles.

FIG. 10 shows the results of XRD analysis performed to examine the c-axis lengths and a-axis lengths of the positive electrode active materials according to Comparative Examples 1 and Example 2 after cycling.

FIG. 11 depicts a graph (FIG. 11a) showing a peak on the (003) plane and a peak on the (104) plane in the positive electrode active material according to Example 2, and a graph (FIG. 11b) showing the ratio between the peaks.

FIG. 12 shows XRD graphs according to Example 2, Example 3, Comparative Example 1, and Comparative Example 2.

FIG. 13 shows XRD graphs according to Example 2, Example 3, Comparative Example 1, and Comparative Example 2.

FIG. 14 shows selected-area electron diffraction (SAED) patterns for the [010] zone axes according to Comparative Example 1 and Example 2.

FIG. 15 shows high-angle annular dark field (HAADF) images for the [010] zone axes according to Comparative Example 1 and Example 2.

BEST MODE

Hereinafter, preferred embodiments of the present invention will be described in detail with reference to the accompanying drawings. However, the technical spirit of the present invention is not limited to the embodiments disclosed herein and may be embodied in other forms. Rather, the embodiments disclosed herein are provided so that this disclosure will be thorough and complete, and will fully convey the spirit of the present invention to those skilled in the art.

Throughout the present specification, when any component is referred to as being "on" another component, it not only refers to a case where the component is directly on the other but also a case where a third component exists between them. In addition, in the drawings, the thicknesses of the film and the region are exaggerated for effective description of the technical contents.

Furthermore, terms such as first, second, third and the like are used in various embodiments of the present specification in order to describe various components, but these components should not be limited by these terms. These terms are only used to distinguish any component from another component. Thus, a component referred to as a first component in any one embodiment may also be referred to as a second component in other embodiments. Each embodiment described and illustrated herein includes its complementary embodiment as well. Moreover, as used herein, the term "and/or," includes at least one of the associated listed items.

In the specification, singular expressions include plural expressions unless specified otherwise in the context thereof. The terms "include", "comprise", "have", etc., are intended to denote the existence of mentioned characteristics, numbers, steps, components, or combinations thereof, but do not exclude the probability of existence or addition of one or more other characteristics, numbers, steps, components, or combinations thereof.

In the following description, the detailed description of related known functions or configurations will be omitted when it may obscure the subject matter of the present invention.

In addition, in the present specification, "the expression "the proportion of the first crystal structure in a specific portion is higher than the proportion of the second crystal structure" means that the specific portion includes both the first crystal structure and the second crystal structure, and means not only that the proportion of the first crystal structure in the specific portion is higher than the proportion of the second crystal structure, but also that the specific portion has only the first crystal structure.

In addition, in the present specification, the crystal system may consist of seven crystal systems: triclinic, monoclinic, orthorhombic, tetragonal, trigonal or rhombohedral, hexagonal, and cubic crystal systems.

In addition, in the present application, "mol %" is interpreted as meaning the content of any metal in a positive electrode active material or a positive electrode active material precursor, based on 100% of the sum of metals other than lithium and oxygen in the positive electrode active material or the positive electrode active material precursor.

Figure 3:
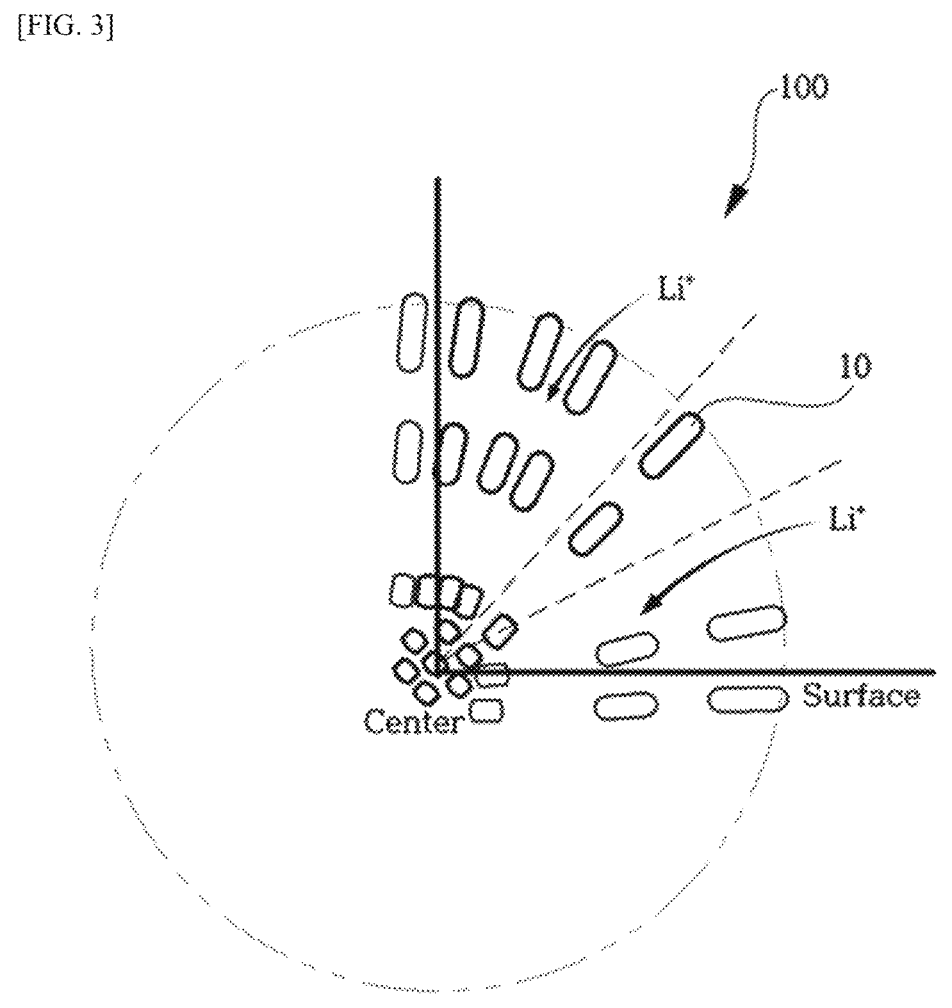

FIG. 1 schematically shows a secondary particle according to an embodiment of the present invention. FIG. 2 is a schematic sectional view of a positive electrode active material according to an embodiment of the present invention. FIG. 3 schematically shows the movement of lithium ions in the positive electrode active material according to an embodiment of the present invention.

Referring to FIGS. 1 to 3, the positive electrode active material according to an embodiment of the present invention may comprise a secondary particle 100 having an approximately spherical shape. The secondary particle 100 may be divided into a central portion 10 and a surface portion 20, and may be formed by aggregation of a plurality of primary particles 30. The primary particles 30 may form a layered structure.

In the secondary particle 100, the primary particles 30 constituting the central portion 10 and the primary particles 30 constituting the surface portion 20 may have the same or different sizes, and the primary particles 30 constituting the surface portion 20 may be provided in a shape having a long axis and a short axis, and at least a portion of the primary particles 30 constituting the surface portion 20 may be oriented toward the central portion 10 of the secondary particle 100. At least a portion of the primary particles 30 constituting the surface portion 20 may be provided in a radial form.

The secondary particle 100 may be composed of one or more metals including lithium, and at least a portion of the one or more metals may be provided to have a concentration gradient in the central portion 10 and the surface portion 20. Alternatively, in the secondary particle 100, a gap may be formed between the central portion 10 and the surface portion 20, or the crystal form may be different between the central portion 10 and the surface portion 20, or a difference in image between the central portion 10 and the surface portion 20 may be created by making the central portion 10 and then making the surface portion 20 to surround the central portion 10. Thus, the secondary particle may be provided in a core-shell form.

The primary particles 30 may extend radially from one region in the second particle toward the surface portion 20 of the secondary particle. The one region in the secondary particle may be the central portion 10 of the secondary particle. In other words, at least a portion of the primary particles 30 may include rod shape particles formed in a flake shape. The rod-shape particles may be oriented so that the long axis thereof faces the central portion of the secondary particle.

Between the primary particles 30, that is, between the primary particles 30 extending in a direction D from the central portion 10 of the secondary particle to the surface portion 20 thereof, a path for movement of metal ions (e.g., lithium ions) and an electrolyte may be provided. Accordingly, the positive electrode active material according to an embodiment of the present invention may improve the charging and discharging efficiency of a secondary battery.

According to one embodiment, in the direction from the center 10 of the secondary particle toward the surface 20 of the secondary particle, the primary particles 30 relatively adjacent to the surface 20 of the secondary particle may have a longer length than the primary particles 30 relatively adjacent to the central portion 10 of the secondary particle. In other words, in at least a portion of the secondary particle extending from the central portion 10 of the secondary particles to the surface 20, the length of the primary particles 30 may increase toward the surface 20.

FIG. 4 schematically shows images (FIGS. 4a and 4b) of a positive electrode active material according to an embodiment of the present invention before and after fluorine addition and heat treatment, and an ordered structure (FIG. 4c) of the positive electrode active material, formed by fluorine addition.

One embodiment of the present invention includes a positive electrode active material for a lithium secondary battery having a layered structure and containing lithium, a transition metal, fluorine (F) and oxygen, wherein the layered structure includes a lithium layer consisting of only lithium, and a transition metal layer consisting of only a transition metal including nickel. The nickel may include $Ni^{3+}$ and $Ni^{2+}$ in terms of oxidation number, and the ratio of the $Ni^{2+}$ to the $Ni^{3+}$ ($Ni^{2+}/Ni^{3+}$) may increase with increasing content of the fluorine. The fluorine-containing positive electrode active material for a lithium secondary battery may be produced by preparing a metal composite hydroxide using a transition metal including nickel, mixing the metal composite hydroxide with a lithium compound to produce a sintered body, and mixing the sintered body with a fluorine compound, followed by heat treatment. For example, in the positive electrode active material, the nickel (Ni) may be contained in an amount of 70 mol % or more.

In general, in a nickel-rich layered positive electrode active material having a nickel content of 70 mol % or more, high capacity can be realized by the nickel, but there is a problem in that side reactions with an electrolyte occur on the surface of the positive electrode active material in a cycling process, and the resulting by-products deteriorate cycle life characteristics.

Such side reactions cause unnecessary consumption of the electrolyte to deplete the electrolyte in the lithium secondary battery, and the by-products composed of organic materials accumulate on the electrode surface to lower the coulombic efficiency of the lithium secondary battery and cause instability. In addition, the by-products can cause degradation of the crystal structure of the particles of the positive electrode active material during the charging and discharging process, thereby deteriorating cycle life characteristics. In particular, in a nickel-rich positive electrode active material, the by-products lead to the suppression of H2-H3 phase transition, causing rapid deterioration in cycle life characteristics.

On the other hand, in the case of the positive electrode active material according to this embodiment, the oxidation number of nickel may be controlled by fluorine addition and heat treatment. Specifically, the ratio of $Ni^{2+}$ to $Ni^{3+}$ ($Ni^{2+}/Ni^{3+}$) may increase as the content of fluorine increases.

The positive electrode active material may have a layered structure, wherein the layered structure further may include a first mixed layer and a second mixed layer, each containing lithium, in addition to the lithium layer composed of only lithium and the transition metal layer made of only a transition metal. The content of lithium in the first mixed layer may be higher than the content of the transition metal, the content of the transition metal in the second mixed layer may be higher than the content of lithium, and nickel contained in the first mixed layer may include nickel having an oxidation number of +2 ($Ni^{2+}$) in a larger amount than nickel having an oxidation number of +3 ($Ni^{3+}$), and specifically, may consist of only nickel having an oxidation number of +2 ($Ni^{2+}$).

The positive electrode active material may include a secondary particle consisting of a group of a plurality of primary particles, and at least one of the primary particles may include a fluorine-containing grain coating layer at a grain boundary between the primary particles. A metal composite hydroxide comprising a transition metal including is mixed with a lithium compound and then produced into a sintered body, and the produced sintered body is mixed with a fluorine compound using ball milling or the like. As a result, the surface of the sintered body is coated with the fluorine compound (F) (see FIG. 4(a)). Then, when the sintered body is heat-treated at 300° C. to 700° C., specifically about 400° C., the fluorine compound applied to the surface of the sintered body may be diffused uniformly into the sintered body, and may be formed into a grain coating layer at the grain boundary between the primary particles.

After mixing of the sintered body with the fluorine compound, heat treatment may be performed at 300° C. to 700° C. If the heat treatment is performed at lower than 300° C., it may be difficult for the fluorine compound to diffuse uniformly into the sintered body, and the heat treatment is performed at higher than 700° C., the electrochemical performance of the positive electrode active material may be degraded.

The primary particles having the grain coating layer formed thereon may prevent side reactions with an electrolyte at the boundary between the primary particles even after long-term cycling, thereby maintaining the lithium ion movement path ($Li^+$ path), so that the movement of lithium ions may be efficiently achieved. In addition, these primary particles may prevent side reactions with the electrolyte in a charging/discharging process, and prevent the layered structure from changing to a cubic crystal structure in the charging/discharging process. For example, the primary particles having the fluorine-containing grain coating layer formed thereon may include rod-shaped particles.

In the positive electrode active material in which the grain coating layer has been formed on at least a portion of the primary particles by fluorine addition and heat treatment, the ratio of $Ni^{2+}$ to $Ni^{3+}$ ($Ni^{2+}/Ni^{3+}$) may increase. The ionic radius of $Li^+$ is 0.72 Å, the ionic radius of $Ni^{2+}$ is 0.69 Å, and the ionic radius of $Ni^{3+}$ is 0.5 Å or more. Since the ionic radius of $Ni^{2+}$ is approximately similar to that of $Li^+$, $Ni^{2+}$ may be probabilistically advantageous for site exchange with $Li^+$ compared to Ni $3^+$. In addition, in this embodiment, through control by fluorine addition and heat treatment, the sites of the lithium ions and the nickel ions may regularly move toward each other, thereby providing a positive electrode active material having a value extending to a new lattice constant. In the positive electrode active material, the ratio of $Ni^{2+}$ to $Ni^{3+}$ ($Ni^{2+}/Ni^{3+}$) may be increased by fluorine addition and heat treatment, and the first mixed layer and the second mixed layer may be formed by site exchange between lithium in the initial lithium layer and nickel in the transition metal layer.

For example, the first mixed layer may be formed by regular site exchange between lithium in the layer composed of only lithium and nickel in the adjacent layer composed of only the transition metal, and at this time, nickel that moved to the first mixed layer may be $Ni^{2+}$. The ratio of $Ni^{2+}$ to $Ni^{3+}$ ($Ni^{2+}/Ni^{3+}$) may be controlled by fluorine addition and heat treatment, and when the ratio of $Ni^{2+}$ to $Ni^{3+}$ ($Ni^{2+}/Ni^{3+}$) is higher than a predetermined level, the first and second mixed layers adjacent to each other may be formed by regular site exchange between $Li^+$ and $Ni^{2+}$ or $Ni^{3+}$, which is not irregular mixing of lithium and nickel (cation mixing). Specifically, regular site exchange between $Li^+$ and $Ni^{2+}$ may be more than regular site exchange between $Li^+$ and $Ni^{3+}$, and more specifically, $Li^+$ may undergo site-exchange with $Ni^{2+}$. The first mixed layer may be a layer formed by providing $Ni^{2+}$ at the lithium site in the layer composed of only lithium, and the second mixed layer may be formed by providing $Li^+$ at the nickel site in the layer composed of only the transition metal including nickel.

In the positive electrode active material, the first mixed layer and the second mixed layer may be stacked adjacent to each other and alternately and regularly repeated to form a layered structure, and the first and second mixed layers stacked adjacent to each other may be provided so that the transition metal of the first mixed layer and the lithium of the second mixed layer correspond to each other. Specifically, the first and second mixed layers stacked adjacent to each other may be provided so that the transition metal of the first mixed layer and the lithium of the second mixed layer correspond to each other.

More specifically, the first and second mixed layers stacked adjacent to each other may have a cationic ordered structure, wherein the cationic ordered structure may be formed such that n1 lithium ions and n2 transition metal ions of the first mixed layer may respectively correspond to n1 transition metal ions and n2 lithium ions of the second mixed layer (where n1 and n2 are the same or different natural numbers).

A unit cell formed by the ordered structure may include a long-range ordered lattice with an increased a-axis lattice constant. A lattice formed by the first and second mixed layers stacked adjacent to each other may include a super-lattice whose a-axis is twice as long as that of a lattice formed by the lithium layer and the transition metal layer.

In the positive electrode active material according to this embodiment, the grain coating layer containing fluorine and the ordered structure formed by fluorine addition and heat treatment may suppress side reactions at the interface between the positive electrode active material and an electrolyte.

In addition, the grain coating layer may further improve electrochemical performance in a charging/discharging process by more stabilizing the interface between the primary particles. In addition, the ordered structure may maximize lattice stability so that crystallinity and the lattice structure may be stably maintained even in repeated charging and discharging cycles.

The positive electrode active material may be represented by the following Formula 1:

$$Li_{1-x}M_{1-y}[Li_xM_y]O_{2-z}F_z \qquad \text{[Formula 1]}$$

wherein $x+y=1$; $0.005 \leq z \leq 0.02$; and M is any one of Ni; Ni and Co; Ni and Mn; and Ni, Co and Mn.

In Formula 1, $Li_{1-x}$ may represent a lithium layer composed of only lithium, $M_{1-y}$ may represent a transition metal layer composed of only a transition metal, and $[Li_xM_y]$ may represent the first and second mixed layers.

In Formula 1, the ratio of $Ni^{2+}$ to $Ni^{3+}$ ($Ni_{2+}/Ni^{3+}$) may decrease as the content of nickel increases. In addition, the ratio of $Ni^{2+}$ to $Ni^{3+}$ ($Ni_{2+}/Ni^{3+}$) may increase as the content of fluorine.

The transition metal may include at least one of nickel (Ni), manganese (Mn) and cobalt (Co), wherein the nickel may have an oxidation number of +2+ and 3+, and the manganese may have an oxidation number of 3+ or 4+, and the cobalt may have an oxidation number of 3+.

The transition metal includes any one or more of nickel (Ni), manganese (Mn) and cobalt (Co), wherein at least one of the transition metals may have a concentration gradient from the center of the secondary particle toward the surface thereof in at least a portion of the secondary particle.

Specifically, at least one of the transition metals may be provided with a concentration gradient from the central portion to the surface portion of the secondary particle, or may be provided with a concentration gradient from the center of the secondary particle to a predetermined portion of the secondary particle and provided at a constant concentration from the predetermined portion to the surface of the secondary particle, or may be provided at a constant concentration from the center of the secondary battery to a predetermined portion thereof and provided with a concentration gradient from the predetermined portion to the surface of the secondary particle.

The positive electrode active material may include a secondary particle consisting of a group of a plurality of primary particles, wherein the secondary particle may include a microcrack which extends from the outermost surface of the secondary particle to the inside of the secondary particle and is a channel through which an electrolyte penetrates the secondary particle. The secondary particle may retain 80% or more of initial specific capacity in a secondary battery employing the positive electrode active material after 5,000 charging/discharging cycles at a discharge rate of 1 C. That is, the positive electrode active material according to this embodiment may retain 80% or more of initial specific capacity after long-term cycling, for example, after 2,000 cycles or 5,000 cycles, and in this case, even if an electrolyte penetrates the inside of the positive electrode active material, side reactions do not occur due to the high stability (crystallinity) of the grain coating layer on the primary particles constituting the positive electrode active material. This is because although microcracks may occur in the positive electrode active material according to this embodiment during long-term cycling, but a problem such as overall collapse of the secondary particle does not arise even when an electrolyte penetrates the secondary particle through the microcracks.

The positive electrode active material according to one embodiment of the present invention may be a secondary particle composed of a group of a plurality of primary particles, wherein the secondary particle may have an approximately spherical shape. The primary particles are oriented from the central portion of the secondary particle toward the surface portion thereof, and the shape of the primary particles in the center portion may be different from the shape of the primary particles in the surface portion.

After a plurality of cycles, microcracks may be formed in the spaces between the primary particles in the secondary particle of the positive electrode active material.

In general, in a positive electrode active material in which the cross-sectional area of microcracks is 20% or more, an electrolyte penetrates the center of the secondary particle during charging and discharging and causes side reactions, whereby the structure of the primary particles collapses rapidly, so that the capacity thereof is lowered in the cycling process.

On the other hand, when the cross-sectional area of the microcracks in the positive electrode active material according to this embodiment is 20% or more, the positive electrode active material the positive electrode active material may retain 80% or more of initial specific capacity in a secondary battery employing the positive electrode active material after 5,000 charging/discharging cycles at a discharge rate of 1 C, and may exhibit excellent cycle characteristics. That is, the positive electrode active material according to an embodiment of the present invention may prevent the penetration of an electrolyte due to the grain coating layer and the ordered structure even when microcracks are formed, and may also exhibit excellent characteristics without reduction in capacity due to the ordered structure that has low reactivity with an electrolyte due to high crystallinity (stability) even when the electrolyte penetrates the positive electrode active material.

According to another aspect of the present invention, one embodiment of the present invention includes a lithium secondary battery including: a positive electrode including the above-described positive electrode active material; a negative electrode facing the positive electrode and composed of graphite or lithium metal; a separator interposed between the positive electrode and the negative electrode; and an electrolyte solution or solid electrolyte containing a lithium salt.

According to still another aspect of the present invention, one embodiment of the present invention may include a method for producing a positive electrode active material for a lithium secondary battery including an ordered structure substituted with lithium and a transition metal, the method including steps of: preparing a metal composite hydroxide with a transition metal by a co-precipitation method; preparing a sintered body by sintering the metal composite hydroxide with a lithium compound; and mixing the sintered body with a fluorine compound, followed by heat treatment at 300° C. to 700° C.

The transition metal may include nickel (Ni).

In the step of preparing the sintered body, the metal composite hydroxide may be pre-sintered at a temperature and then sintered at a temperature higher than the pre-sintering temperature.

Subsequently, the sintered body may be mixed with a fluorine compound such as ammonium fluoride ($NH_4F$), and then heat-treated at 300° C. to 700° C. to form a fluorine-containing grain coating layer on at least a portion of the surface of the sintered body.

The positive electrode active material may include a secondary particle composed of a group of primary particles and having an approximately spherical shape, and the grain coating layer may be formed on at least one of the primary particles at the grain boundary between the primary particles.

The sintered body and the fluorine compound may be mixed together using ball milling at room temperature before heat treatment. By mixing the sintered body and the fluorine compound under pressure using ball milling, the fluorine compound may be diffused into the sintered body after heat treatment.

Hereinafter, examples and comparative examples of the present invention will be described. However, the following examples are only preferred examples of the present invention, and the scope of the present invention is not limited by the following examples.

1. Production of Positive Electrode Active Material

Example 1 (F0.5-Concentration Gradient Type NCM80)

10 liters of distilled water was placed in a co-precipitation reactor (volume: 40 L), and then $N_2$ gas was supplied into the reactor at a rate of 6 liters/minute and stirred at 350 rpm while the temperature of the reactor was maintained at 40° C. Nickel sulfate aqueous solution ($NiSO_4 \cdot 6H_2O$, Samchun Chemicals), cobalt sulfate aqueous solution ($CoSO_4 \cdot 7H_2O$, Samchun Chemicals), and manganese sulfate aqueous solution ($MnSO_4 \cdot H_2O$, Samchun Chemicals) were mixed together in amounts such that the molar ratio between nickel (Ni), cobalt (Co) and manganese (Mn) was 80:5:15, thus preparing a 2M metal solution. The prepared 2M metal solution and a 16M ammonia solution ($NH_4OH$, JUNSEI) were continuously introduced into the reactor at rates of 0.561 liters/hour and 0.08 liters/hour, respectively. In the co-precipitation reaction process, the pH in the reactor was checked and maintained at 11.4 by adding NaOH (aq.) solution into the reactor.

A co-precipitation reaction was performed in the reactor, and nanoparticle hydroxide was first formed during the reaction process, and then nickel-cobalt-manganese-tungsten hydroxide was slowly accumulated on the surface of the nanoparticle hydroxide to form a micro-sized precursor. Next, the prepared precursor was washed several times with distilled water, filtered through a filter, and dried in a dry oven at 110° C. for 12 hours to obtain a $[Ni_{0.80}Co_{0.05}Mn_{0.15}](OH)_2$ metal composite hydroxide.

The obtained $[Ni_{0.80}Co_{0.05}Mn_{0.15}](OH)_2$ metal composite hydroxide and $LiOH \cdot H_2O$ were uniformly mixed together such that the molar ratio of Li:(Ni+Co+Mn) was 1.01:1. Then, the mixture was sintered at 770° C. for 10 hours to obtain a sintered body of $Li[Ni_{0.80}Co_{0.05}Mn_{0.15}](OH)_2$. Then, the sintered body was mixed with ammonium fluoride ($NH_4F$) and then heat-treated at 400° C. to obtain positive electrode active material powder containing 0.5 mol % of fluorine.

Example 2 (F1-Concentration Gradient Type NCM80)

Positive electrode active material powder was obtained in the same manner as in Example 1, except that the sintered body was mixed with ammonium fluoride ($NH_4F$) and then heat-treated at 400° C. so that it contained 1 mol % of fluorine.

Example 3 (F2-Concentration Gradient Type NCM80)

Positive electrode active material powder was obtained in the same manner as in Example 1, except that the sintered body was mixed with ammonium fluoride ($NH_4F$) and then heat-treated at 400° C. so that it contained 2 mol % of fluorine.

Comparative Example 1 (Concentration Gradient Type NCM80)

Positive electrode active material powder composed a sintered body of $Li[Ni_{0.80}Co_{0.05}Mn_{0.15}](OH)_2$ was obtained in the same manner as in Example 1, except that the processes of mixing the sintered body with ammonium fluoride ($NH_4F$) and heat-treating the mixture were omitted.

Comparative Example 2 (F10-Concentration Gradient Type NCM80)

Positive electrode active material powder was obtained in the same manner as in Example 1, except that the sintered body was mixed with ammonium fluoride ($NH_4F$) and then heat-treated at 400° C. so that it contained 10 mol % of fluorine.

Table 1 below shows the contents of Examples 1 to 3, Comparative Example 1 and Comparative Example 2.

TABLE 1

| | Metal composite hydroxide | F content |
|---|---|---|
| Example 1 | gradient NCM = 80:5:15 | 0.5 mol % |
| Example 2 | gradient NCM = 80:5:15 | 1 mol % |
| Example 3 | gradient NCM = 80:5:15 | 2 mol % |
| Comparative Example 1 | gradient NCM = 80:5:15 | 0 |
| Comparative Example 2 | gradient NCM = 80:5:15 | 10 mol % |

2. Fabrication of Half-Cells and Full-Cells Using Examples and Comparative Examples Half-cells and full-cells were fabricated using the positive electrode active materials according to the above-described Examples and Comparative Examples.

To fabricate the half-cells and the full-cells, the powder-type positive electrode active material produced according to each of the Examples and the Comparative Examples, poly(vinylidene fluoride) and carbon black at a weight ratio of 90:4.5:5.5 were added into N-methyl pyrrolidone (0.4 g per g of the positive electrode active material) and then uniformly mixed together, thereby preparing positive electrode slurries. An aluminum foil was coated with each of the prepared positive electrode slurries, roll-pressed, and then dried under vacuum, thereby producing positive electrodes.

To fabricate half-cells using the produced positive electrode active materials, an aluminum foil was coated with each of the prepared positive electrode active material slurries so that the loading level of the positive electrode active material was 5 mg/cm² (meaning that, when a square of 1 cm² is sampled from the aluminum foil coated with the positive electrode active material, the weight of only the positive electrode active material in the positive electrode is 5 mg), thereby producing positive electrodes. The electrolyte used was obtained by uniformly dissolving 2 wt % vinylene carbonate (VC) and 1.2 mol/L lithium salt $LiPF_6$ as additives in ethylene carbonate: ethyl methyl carbonate (EC:EMC=3:7 v/v) as a solvent. As half-cells, 2032-coin type half-cells (hereinafter referred to as coil cells) employing Li metal as a negative electrode were fabricated.

To fabricate full-cells using the produced positive electrode active materials, an aluminum foil was coated with each of the prepared positive electrode active material slurries so that the loading level of the positive electrode active material was 8.5 mg/cm², thereby producing positive electrodes. In addition, an aluminum foil was coated with a prepared graphite slurry at a loading level of 6.5 mg/cm², roll-pressed, and then dried under vacuum, thereby producing a negative electrode. The electrolyte used was obtained by uniformly dissolving 2 wt % vinylene carbonate (VC) and 1.2 mol/L lithium salt $LiPF_6$ as additives in ethylene carbonate: ethyl methyl carbonate (EC:EMC=3:7 v/v) as a solvent. Each of the positive electrodes, a separator (Celgard, model 2320) and the negative electrode were stacked in a pouch-type battery case, and sealed together with the prepared electrolyte, thereby fabricating pouch-type full-cells.

3. Evaluation of Examples and Comparative Examples (1) Evaluation of capacity and cycle characteristics using half-cells Each of the fabricated half-cells was subjected to a 300-cycle charge/discharge test by charging to 4.3 V and discharging to 2.7 V at a constant current of 0.5 C (1 C: 180 mA/g) at 30° C., and the recovered capacities were measured (hereinafter referred to as 2.7V-4.3V).

(1) Evaluation of capacity and cycle characteristics using full-cells

The fabricated full cells were cycled between 3.0 V (discharge voltage) and 4.2 V (charge voltage) at a constant current of 1 C at 25° C., and the capacities and recovered capacities were measured.

(3) Analysis of microstructures of metal composite hydroxide (precursor) and positive electrode active materials using SEM, TEM, XRD, and XPS For the positive electrode active materials according to the Examples and the Comparative Examples and the metal composite hydroxide (precursor) before pre-sintering for forming the positive electrode active materials, the microstructures, crystal structures, etc. were analyzed by SEM (Nova Nano SEM 450, FEI). The positive electrode active material particles were cut, and the cross-sections of the positive electrode active materials were imaged using a transmission electron microscope (TEM).

X-ray diffraction (XRD) analysis was performed using CuKα radiation as an X-ray diffraction light source. The analysis was performed at a scan rate of 1°/min in the 2θ value range of 15° to 70°, and performed at a scan rate of 0.2°/min in the 2θ value range of 19° to 23°.

Using the Qunatum 2000 (Physical Electronics) system, XPS analysis was performed on the positive electrode active materials. The XPS analysis was performed using Quantum 2000 (Physical Electronics. Inc.) (acceleration voltage: 0.5 to 15 key, 300 W, energy resolution: about 1.0 eV, minimum analysis area: 10 micro, and sputter rate: 0.1 nm/min).

FIG. 4 shows mapping images of the positive electrode active material according to Example 1 before and after fluorine coating and heat treatment, and HAADF-TEM images of the ordered structure.

FIG. 5 depicts graphs showing the electrochemical capacities (FIG. 5a) and cycle life characteristics (FIG. 5b) of the coin cells employing the positive electrode active materials according to Examples 1 to 3 of the present invention and Comparative Example 1. Table 2 below shows numerical values for the capacities and cycle life characteristics according to the Examples of the present invention and the Comparative Examples.

TABLE 2

| | F content | 0.5 C, discharge capacity (mAh/g) | 0.5 C/ 0.1 C | Cycles | 0.5 C cycle retention |
|---|---|---|---|---|---|
| Example 1 | 0.5 mol % | 202.4 | 94.0% | 100 | 95.6% |
| Example 2 | 1 mol % | 199.6 | 92.8% | 100 | 99.7% |
| Example 3 | 2 mol % | 190.7 | 90.6% | 100 | 104.1% |
| Comparative Example 1 | 0 mol % | 201.1 | 93.0% | 100 | 94.2% |
| Comparative Example 2 | 10 mol % | 105 | 80% | 100 | 92% |

Referring to FIG. 5 and Table 2 above, it can be confirmed that the overall capacity was retained even by the addition of fluorine. In addition, it could be confirmed that Examples 1 to 3 exhibited excellent cycle life characteristics compared to Comparative Example 1 in which fluorine was not added. For example, in the case of the half-cell, a change in 0.1 C capacity and 0.5 C capacity at charge and discharge voltages of 2.7 V to 4.3 V at room temperature (25° C. to 30° C.) should be a decrease of 5% or less relative to Comparative Example 1 in which fluorine was not added. On the other hand, it could be confirmed that, in the case of Comparative Example 2, the capacity characteristics were degraded because the content of fluorine was excessively high. In the case of Examples 1 to 3, the structural stability was improved by the ordered structure controlled by the addition of fluorine and the grain coating layer, and thus the long-term cycle characteristics were improved. On the other hand, in the case of Comparative Example 2 in which the content of fluorine was excessively high, the thickness of the grain coating layer formed at the grain boundary of the primary particles becomes excessively large, so that the passage space for the movement of lithium ions may be reduced, thereby reducing the efficiency with which lithium ions move.

FIG. 6 is a graph showing the resistances of the coin cells employing the positive electrode active materials according to Comparative Examples 1 and Example 2 of the present invention. Table 3 below shows resistance values depending on the number of cycles for Comparative Example 1 and Example 1 of the present invention.

TABLE 3

|  | F content | 25 cycles | 50 cycles | 75 cycles | 100 cycles |
|---|---|---|---|---|---|
| Comparative Example 1 | 0 mol % | 12.78 Ω | 17.83 Ω | 21.4 Ω | 26.7 Ω |
| Example 2 | 1 mol % | 8.41 Ω | 8.64Ω | 9.15 Ω | 9.92 Ω |

Referring to FIG. 6 and Table 3, it could be confirmed that, in the case of Comparative Example 1, the resistance value increased as the number of cycles increased, whereas in the case of Example 2, the resistance value hardly changed even when the number of cycles increased. That is, it could be confirmed that, in the case of Comparative Example 1, side reactions between the positive electrode active material and the electrolyte occurred during cycling to create resistance at the interface between them, whereas in the case of Example 2, side reactions hardly occurred during cycling. Therefore, it could be confirmed that, in the case of Example 2, the electrochemical properties were maintained constant with little change during the cycling process, compared to the case of Example 1.

FIG. 7 depicts graphs showing the cycle characteristics and resistances versus SOC of full cells employing the positive electrode active materials according to Comparative Examples 1 and Example 2 of the present invention. FIG. 8 shows TEM images showing an ordered structure of the positive electrode active material according to Example 2 after 2,000 cycles. FIG. 9 shows TEM images showing an ordered structure of the positive electrode active material according to Example 2 after 5,000 cycles.

Table 4 shows resistance values depending on SOC for Comparative Examples 1 and 2.

Referring to FIG. 7 and Table 4 show the results of performing 2000 charging/discharging cycles at 1 C for the full cells employing Comparative Example 1 and Example 2, and it could be confirmed that, in the case of Comparative Example 1, as the number of cycles increased, the capacity decreased and the resistance increased. On the other hand, it could be confirmed that, in the case of Example 2, there was little change in the capacity even when the number of cycles increased, and even after 5,000 cycles, the capacity was maintained constant, and the resistance did not change significantly. It could be confirmed that, in the case of Example 2, side reactions with the electrolyte did not occur due to the ordered structure and the grain coating layer even during long-term cycling, and thus Example 1 could exhibit stable electrochemical properties without structural collapse, whereas in the case of Comparative Example 1, changes in the crystal structure, such as the separation of lithium ions from the lithium layer, and the change of a portion of the layered structure to a cubic crystal structure, did occur during the cycling process, and thus the electrochemical properties deteriorated. Referring to the SEM images in FIG. 7, from a comparison between (c) which shows the cross-section of particles at 2,000 cycles for Comparative Example 1, (d) which shows the cross-section of particles at 2000 cycles for Example 2, and e which shows the cross-section at 5,000 cycles for Example 2, it could be confirmed that the micro-cracks in the particles themselves were almost similar and that the cross-sectional area of the micro-cracks was about 20% or more of the total area of the secondary particle. That is, it could be confirmed that, even when the cross-sectional area of the microcracks were 20% or more, the structural stability of the positive electrode active material according to the Example of the present invention was maintained due to the grain coating layer formed by fluorine addition and heat treatment and the ordered structure controlled by fluorine addition and heat treatment, a decrease in the capacity and an increase in the resistance of the positive electrode active material did not occur during the cycling process, and the positive electrode active material had excellent electrochemical properties.

FIG. 8 shows images of the positive electrode active material of Example 2 after 2,000 cycles, and FIG. 9 shows images of the positive electrode active material of Example 2 after 5,000 cycles. From FIGS. 8 and 9, it could be confirmed that the ordered structure was maintained.

FIGS. 8 and 9 show electron diffraction patterns for the [010] zone axis or the [100] zone axis. The electron diffraction patterns show: a first diffraction spot group G1 in which one or more diffraction spots having a first intensity and corresponding to a lattice formed by the lithium layer and transition metal layer stacked adjacent to each other are aligned in one direction; and a second diffraction spot group G2 in which one or more diffraction spots having a second intensity relatively lower than the first intensity of the diffraction spots of the first diffraction group G1 and corresponding to a lattice formed by the first mixed layer and

TABLE 4

| | F content | Number of cycles | Resistance (mΩ) depending on SOC (%) | | | | | | | | | |
|---|---|---|---|---|---|---|---|---|---|---|---|---|
| | | | 10 | 20 | 30 | 40 | 50 | 60 | 70 | 80 | 90 | 100 |
| Comparative | 0 | 1st | 45.28 | 23.76 | 23.04 | 22.32 | 23.04 | 23.04 | 23.04 | 27.36 | 34.32 | 47.12 |
| Example 1 | mol % | 2000th | 341.4 | 305.8 | 150.6 | 145 | 147.8 | 155 | 166.9 | 193.3 | 184.7 | 242.2 |
| Example 2 | 1 | 1st | 40.08 | 28.72 | 27.92 | 27.92 | 27.92 | 29.28 | 30.32 | 33.44 | 44.8 | 57.68 |
| | mol % | 2000th | 160.7 | 83.81 | 64.96 | 77.71 | 75.41 | 78.19 | 77.49 | 82.03 | 82.51 | 136.5 | second mixed layer stacked adjacent to each other are aligned in one direction. The first diffraction spot group and the second diffraction spot group indicate an ordered structure.

FIG. 10 shows the results of XRD analysis performed to examine the c-axis lengths and a-axis lengths of the positive electrode active materials according to Comparative Examples 1 and Example 2 after cycling. Table 5 below shows the c-axis lengths and a-axis lengths according to Comparative Examples 1 and Example 2 after long-term cycling.

TABLE 5

| | F content | 1 cycle | | 2,000 cycles | | 5,000 cycles | |
| --- | --- | --- | --- | --- | --- | --- | --- |
| | | a-axis (Å) | c-axis (Å) | a-axis (Å) | c-axis (Å) | a-axis (Å) | c-axis (Å) |
| Comparative Example 1 | 0 mol % | 2.87469 | 14.21533 | 2.86854 | 14.28762 | — | — |
| Example 2 | 1 mol % | 2.87552 | 14.21813 | 2.87783 | 14.24427 | 2.8689 | 14.26401 |

Referring to FIG. 10 and Table 5, in the case of Comparative Example 1 (a), after long-term cycling of 2,000 cycles, lithium ions in the lattice were lost, and vacancies of lithium ions in the lithium layer occurred, whereby the c-axis length of the crystal structure increased significantly while the a-axis length hardly changed. Accordingly, in the crystal structure of the primary particles constituting Comparative Example 1, the arrangement of the primary particles constituting the secondary particle was disrupted due to the increase in the c-axis length, and the passage for lithium ions was blocked as a whole, thereby degrading the electrochemical properties. On the other hand, in the case of Example 2, both the a-axis length and the c-axis length hardly changed until 2,000 cycles and 5,000 cycles, because the shape and arrangement of the initial primary particles were maintained. In the case of Example 2, lithium and nickel were exchanged with each other between the layer composed of only lithium and the layer composed of the transition metal including nickel, which are adjacent to each other, during long-term cycling, and thus lithium and the transition metal were positioned at sites corresponding to each other between the first mixed layer (layer formed by site exchange between lithium in the lithium layer and nickel) and the second mixed layer (layer formed by site exchange between nickel in the transition metal layer and lithium), thus forming an ordered structure. The unit cell formed by the ordered structure included a long-range ordered lattice with an increased a-axis lattice constant. The long-range ordered lattice consisted of a superlattice whose a-axis was twice as long as that of the lattice formed by the lithium layer and the transition metal layer, and thus it could improve the stability of the layered structure, thereby preventing the structural collapse of the layered structure.

FIG. 11 depicts a graph (FIG. 11a) showing a peak on the (003) plane and a peak on the (104) plane in the positive electrode active material according to Example 2, and a graph (FIG. 11b) showing the ratio between the peaks. Table 6 below shows the content of divalent nickel ions in the lithium layer, the peaks the (104) plane, and the ratio between peaks.

TABLE 6

| | Comparative Example 1 | Example 1 | Example 2 | Example 3 | Comparative Example 2 |
| --- | --- | --- | --- | --- | --- |
| F content | 0 mol % | 0.5 mol % | 1 mol % | 2 mol % | 10 mol % |
| $Ni^{2+}$ (%) in Li layer | 4.3 | 4.3% | 4.7 | 4.8 | 6.8 |
| Increase rate (%) of $Ni^{2+}$ in Li layer | 1 | 1 | 1.1 | 1.13 | 1.63 |

TABLE 6-continued

| | Comparative Example 1 | Example 1 | Example 2 | Example 3 | Comparative Example 2 |
| --- | --- | --- | --- | --- | --- |
| $I_{(003)}/I_{(104)}$ | 1.74 | 1.74 | 1.72 | 1.71 | 1.59 |
| Decrease rate of $I_{(003)}/I_{(104)}$ | 1 | 1 | 0.99 | 0.98 | 0.92 |

Referring to FIG. 11 and Table 6 which show the content (%) of $Ni^{2+}$ in the first mixed layer (a layer having sites substituted with nickel in the layer composed of only lithium), it could be confirmed that, as the content of F increased, the content (%) of $Ni^{2+}$ in the first mixed layer increased, and that the decrease rate of $I_{(003)}/I_{(104)}$, which is the ratio of a peak ($I_{(003)}$) on the (003) plane to a peak ($I_{(104)}$) on the (104) plane, was 1% or less. Specifically, $I_{(003)}/I_{(104)}$ could be decreased by regular site exchange between lithium ions and nickel ions having an oxidation number of 2. In addition, $I_{(003)}/I_{(104)}$, which is the ratio of a peak ($I_{(003)}$) on the (003) plane to a peak ($I_{(104)}$) on the (104) plane, could be 1.71 or less.

FIG. 12 shows XRD graphs according to Example 2, Example 3, Comparative Example 1, and Comparative Example 2.

Referring to FIG. 12, it could be confirmed that the crystal structure of the positive electrode active material did not change even when the ordered structure formed was increased due to an increase in the amount of fluorine added. This is because the ordered structure could form a certain regular lattice, and thus maintained the layered structure of the positive electrode active material, and the lithium ions and nickel ions (oxidation number of 2) formed in the first mixed layer or the second mixed layer had similar ionic radii. because it does FIG. 13 shows XRD graphs according to Example 2, Example 3, Comparative Example 1, and Comparative Example 2. FIG. 14 shows selected-area electron diffraction (SAED) for the [010] zone axes according to Comparative Examples 1 and 2. FIG. 15 shows high-angle annular dark field (HAADF) images for the [010] zone axes according to Comparative Example 1 and Example 2. Table 7 below shows the content of nickel depending on the oxidation number of nickel oxidation for Examples 1 to 3 and Comparative Examples 1 and 2.

TABLE 7

| | | Arial ratio | | | | |
| | | | Total | Fraction (%) | | ratio |
| | F content | Ni$^{2+}$ | Ni$^{3+}$ | (intensity) | Ni$^{2+}$ | Ni$^{3+}$ | Ni$^{2+}$/Ni$^{3+}$ |
|---|---|---|---|---|---|---|---|
| Comparative Example 1 | 0 mol % | 76.7 | 262.3 | 339 | 22.60% | 77.40% | 29.20% |
| Example 1 | 0.5 mol % | 110.1 | 230 | 340.1 | 32.4% | 67.6% | 49.7% |
| Example 2 | 1 mol % | 157.8 | 180.8 | 338.6 | 46.60% | 53.40% | 87.30% |
| Example 3 | 2 mol % | 190.9 | 153.4 | 344.3 | 55.40% | 44.60% | 124.20% |
| Comparative Example 2 | 10 mol % | 213.5 | 150.3 | 363.8 | 58.70% | 41.30% | 142.10% |

Referring to FIG. 13 and Table 7, it could be confirmed that nickel included Ni$^{3+}$ and Ni$^{2+}$ in terms of oxidation number, and the ratio of Ni$^{2+}$ to Ni$^{3+}$ (Ni$^{2+}$/Ni$^{3+}$) increased as the content of fluorine increased. At this time, when the ratio of Ni$^{2+}$ to Ni$^{3+}$ (Ni$^{2+}$/Ni$^{3+}$) was within a certain range, the ordered structure between the first mixed layer and the second mixed layer was formed in the layered structure of the positive electrode active material, an ordering structure between the first mixed layer and the second mixed layer, and thus the layered structure was more stably maintained without the separation of lithium ions therefrom during long-term cycling. In the XPS spectrum of Ni2P obtained by X-ray photoelectron spectroscopy (XPS), the peak area of Ni$^{2+}$ at a binding energy of 850 to 860 eV was larger than the peak area of Ni$^{3+}$, and the ratio of Ni$^{2+}$ to Ni$^{3+}$ (Ni$^{2+}$/Ni$^{3+}$) could be 49.7% to 130%. In addition, the ratio of the peak area of Ni$^{2+}$ to the peak area of Ni$^{3+}$ at a binding energy of 850 to 860 eV could be 0.497:1 to 1.3:1.

FIG. 15 shows electron diffraction patterns for the [010] zone axis according to Example 2.

Referring to FIG. 15, it can be confirmed that the positive electrode active material of Example 2 had both a layered structure and an ordered structure. The layered structure is one in which a lithium layer composed of only lithium and a transition metal layer composed of only a transition metal are alternately provided. As shown in the left figures of FIGS. 15 and 16, only the diffraction spots (peaks) in the (012), (014), and (003) space groups were found. In the ordered structure, diffraction spots (peaks) that did not appear in the layered structure appeared due to the lithium and transition metal of the first and second mixed layers, which were site-exchanged, and these diffraction spots had a lower intensity than the diffraction spots that appeared in the layered structure.

Specifically, in the ordered structure, the first mixed layer and the second mixed layer were stacked adjacent to each other and were alternately and regularly repeated to form a layered structure. Electron diffraction patterns for the [010] zone axis (or [100] zone axis) of the ordered structure showed: a first diffraction spot group G1 in which one or more diffraction spots having a first intensity and corresponding to a lattice formed by the lithium layer and transition metal layer stacked adjacent to each other are aligned in one direction; and a second diffraction spot group G2 in which one or more diffraction spots having a second intensity relatively lower than the first intensity of the diffraction spots of the first diffraction group G1 and corresponding to a lattice formed by the first mixed layer and second mixed layer stacked adjacent to each other are aligned in one direction.

The first diffraction spot group G1 and the second diffraction spot group G2 are arranged alternately with each other and regularly, and the first diffraction spot group G1 and the second diffraction spot group G2 may be spaced apart from each other at the same interval.

In the case of Example 2, the ratio of Ni$^{2+}$ to Ni$^{3+}$ (Ni$^{2+}$/Ni$^{3+}$) was increased by fluorine addition and heat treatment, and thus Ni$^{2+}$ was site-exchanged with lithium of the adjacent layer composed of only lithium to form the first mixed layer and the second mixed layer. In the electron diffraction patterns, the layer composed of only lithium did not display diffraction spots, but only the transition metal layer displayed diffraction spots in the form of white dots (top right of FIG. 12). On the other hand, when the first and second mixed layers were formed to form the ordered structure, diffraction spots were formed in the portions shown only in black to form a superlattice.

For example, in the first mixed layer, lithium and the transition metal may be alternately arranged, and in the second mixed layer, the transition metal and lithium may be alternately arranged. The lattice formed by the first and second mixed layers stacked adjacent to each other may include a superlattice, and the superlattice may have six lithium atoms and one transition metal atom.

Although the present invention has been described above in detail with reference to preferred embodiments, but the scope of the present invention is not limited to specific embodiments, and should be defined by the appended claims. In addition, those skilled in the art will understand that many modifications and variations are possible without departing from the scope of the present invention.

DESCRIPTION OF REFERENCE NUMERALS

10: central portion
20: surface portion
30: primary particles
100: secondary particle

The invention claimed is:

1. A positive electrode active material for a lithium secondary battery having a layered structure and containing lithium, a transition metal, fluorine (F) and oxygen,
   wherein the layered structure comprises a lithium layer consisting of only lithium, and a transition metal layer consisting of only a transition metal including nickel,
   wherein the nickel comprises Ni$^{3+}$ and Ni$^{2+}$ in terms of oxidation number, and a ratio of the Ni$^{2+}$ to the Ni$^{3+}$ (Ni$^{2+}$/Ni$^{3+}$) increases with increasing content of the fluorine,
   wherein the layered structure further comprises a first mixed layer and a second mixed layer, each containing lithium and a transition metal, wherein the first mixed layer and the second mixed layer are stacked adjacent to each other and alternately and regularly repeated to form the layered structure, and the first and second mixed layers stacked adjacent to each other are configured such that the transition metal of the first mixed layer and the lithium of the second mixed layer correspond to each other, and wherein a lattice formed by the first and second mixed layers stacked adjacent to each other comprises a superlattice whose a-axis is twice as long as that of a lattice formed by the lithium layer and the transition metal layer.

2. The positive electrode active material of claim 1, wherein a content of lithium in the first mixed layer is higher than a content of the transition metal, and a content of the transition metal in the second mixed layer is higher than a content of lithium.

3. The positive electrode active material of claim 1, wherein the first and second mixed layers stacked adjacent to each other have an ordered structure, wherein the ordered structure is formed such that n1 lithium ions and n2 transition metal ions of the first mixed layer respectively correspond to n1 transition metal ions and n2 lithium ions of the second mixed layer (where n1 and n2 are the same or different natural numbers), and a unit cell formed by the ordered structure comprises a long-range ordered lattice with an increased a-axis lattice constant.

4. The positive electrode active material of claim 1, wherein a decrease in a ratio ($I_{(003)}/I_{(104)}$) of a peak ($I_{(003)}$) of a (003) plane to a peak ($I_{(004)}$) of a (004) plane in an X-ray diffraction (XRD) spectrum of the positive electrode active material, obtained by XRD analysis using CuKα radiation after the increasing the content of the fluorine, is less than 1%.

5. The positive electrode active material of claim 4, wherein the ratio ($I_{(003)}/I_{(104)}$) of the peak ($I_{(003)}$) of the (003) plane to the peak ($I_{(004)}$) of the (004) plane is 1.71 or less.

6. The positive electrode active material of claim 1, wherein, in an XPS spectrum of Ni2P obtained by X-ray photoelectron spectroscopy (XPS), a peak area of $Ni^{2+}$ at a binding energy of 850 to 860 eV is greater than a peak area of $Ni^{3+}$, and the ratio of $Ni^{2+}$ to $Ni^{3+}$ ($Ni^{2+}/Ni^{3+}$) is 49% to 130%.

7. The positive electrode active material of claim 6, wherein the ratio of the peak area of $Ni^{2+}$ to the peak area of $Ni^{3+}$ at a binding energy of 850 to 860 eV is 0.49:1 to 1.3:1.

8. The positive electrode active material of claim 1, wherein the positive electrode active material comprises a secondary particle consisting of a group of a plurality of primary particles, and at least one of the plurality of primary particles comprises a grain coating layer containing the fluorine at a grain boundary between others of the plurality of primary particles.

9. The positive electrode active material of claim 8, wherein the plurality of primary particles comprises rod-shaped particles formed in a flake shape whose cross-section has a long axis and a short axis, and the rod-shape particles are oriented so that the long axis thereof faces a central portion of the secondary particle.

10. The positive electrode active material of claim 1, wherein the positive electrode active material is represented by the following Formula 1:

$$Li_{1-x}M_{1-y}[Li_xM_y]O_{2-z}F_z \qquad \text{[Formula 1]}$$

wherein x+y=1; 0.005≤z≤0.02; and M is any one of Ni; Ni and Co; Ni and Mn; Ni, Co and Mn; Ni and Al; Ni, Co and Al; Ni, Mn and Al; and Ni, Co, Mn and Al.

11. The positive electrode active material of claim 1, wherein a content of lithium in the first mixed layer is higher than a content of the transition metal, and a content of the transition metal in the second mixed layer is higher than a content of lithium; and an electron diffraction pattern for a [010] zone axis or [100] zone axis of the layered structure shows:

a first diffraction spot group in which one or more diffraction spots having a first intensity and corresponding to a lattice formed by the lithium layer and transition metal layer stacked adjacent to each other are aligned in one direction; and a second diffraction spot group in which one or more diffraction spots having a second intensity lower than the first intensity of the one or more diffraction spots of the first diffraction group and corresponding to a lattice formed by the first mixed layer and second mixed layer stacked adjacent to each other are aligned in one direction.

12. The positive electrode active material of claim 11, wherein the first diffraction spot and the second diffraction spot group are arranged alternately with each other and regularly, and the first diffraction spot group and the second diffraction spot group are spaced apart from each other.

13. The positive electrode active material of claim 1, wherein a content of lithium in the first mixed layer is higher than a content of the transition metal, and a content of the transition metal in the second mixed layer is higher than a content of lithium;

the lithium and transition metal in the first mixed layer are alternately arranged; and the transition metal and lithium in the second mixed layer are alternately arranged.

14. The positive electrode active material of claim 1, wherein the transition metal comprises any one or more of nickel (Ni), manganese (Mn) and cobalt (Co), wherein at least one of the transition metals has a concentration gradient from a center of a secondary particle toward a surface thereof in at least a portion of the secondary particle.

15. A lithium secondary battery comprising:

a positive electrode comprising the positive electrode active material for a lithium secondary battery according to claim 1;

a negative electrode facing the positive electrode and composed of graphite or lithium metal;

a separator interposed between the positive electrode and the negative electrode; and an electrolyte solution or solid electrolyte containing a lithium salt.

*    *    *    *    *